US012731147B2

(12) United States Patent
Jorlett et al.

(10) Patent No.: US 12,731,147 B2
(45) Date of Patent: Sep. 8, 2026

(54) DYNAMIC BEHAVIORAL PROFILING USING TRAINED MACHINE-LEARNING AND ARTIFICIAL-INTELLIGENCE PROCESSES

(71) Applicant: The Toronto-Dominion Bank, Toronto (CA)

(72) Inventors: Devon David Jorlett, Crystal, MN (US); Adrienne Vickery, Toronto (CA); Matthew Walter Misler, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 13 days.

(21) Appl. No.: 17/707,658

(22) Filed: Mar. 29, 2022

(65) Prior Publication Data

US 2023/0113752 A1 Apr. 13, 2023

Related U.S. Application Data

(60) Provisional application No. 63/255,293, filed on Oct. 13, 2021.

(51) Int. Cl.
*G06Q 40/00* (2023.01)
*G06F 18/21* (2023.01)
(Continued)

(52) U.S. Cl.
CPC ....... *G06Q 20/4016* (2013.01); *G06F 18/217* (2023.01); *G06N 20/00* (2019.01)

(58) Field of Classification Search
CPC ... G06Q 20/4016; G06F 18/217; G06N 20/00
See application file for complete search history.

(56) References Cited

U.S. PATENT DOCUMENTS 7,457,401 B2 * 11/2008 Lawyer ................. H04M 15/47 379/189
9,148,869 B2 * 9/2015 Van Heerden ........ G06F 21/316
(Continued)

FOREIGN PATENT DOCUMENTS

WO WO-0030398 A1 * 5/2000 ............ H04M 15/44
WO WO-2008134039 A1 * 11/2008 ............ G06Q 20/40

OTHER PUBLICATIONS

Shirgave et al., "A Review on Credit Card Fraud Detection Using Machine Learning," International Journal of Scientific and Technology Research, vol. 8, Issue 10, Oct. 2019 (Year: 2019).*
(Continued)

*Primary Examiner* — Abhishek Vyas
*Assistant Examiner* — William B. Bunker
(74) *Attorney, Agent, or Firm* — Nixon Peabody LLP

(57) ABSTRACT

The disclosed embodiments include computer-implemented systems and methods that dynamically profile behavior using trained machine-learning or artificial-intelligence processes. For example, an apparatus may obtain a data element associated with an exchange of data, and based on an application of a trained machine-learning or artificial-intelligence process to an input dataset associated with the data element, the apparatus may generate behavioral profile data that includes a range of expected deviations from an expected value of the parameter during a temporal interval. Based on a determination that the range of expected deviations fails to include the first parameter value, the apparatus may perform operations that prioritize the position of the data element within the alert queue, and transmit, to a device, a notification that includes the data element and information characterizing the prioritized position of the data element within the alert queue.

13 Claims, 8 Drawing Sheets

(51) Int. Cl.
*G06Q 20/40* (2012.01)
*G06N 20/00* (2019.01)

(56) References Cited

U.S. PATENT DOCUMENTS

| | | | | |
|---|---|---|---|---|
| 9,641,418 | B1* | 5/2017 | Moyer | H04L 43/16 |
| 10,949,850 | B1* | 3/2021 | Velline | G06Q 20/405 |
| 11,379,855 | B1* | 7/2022 | Anderson | G06N 20/00 |
| 11,514,456 | B1* | 11/2022 | Smith | G06Q 20/405 |
| 11,605,095 | B1* | 3/2023 | Noh | G06Q 10/0633 |
| 11,687,938 | B1* | 6/2023 | Kramme | G06Q 30/0185 705/44 |
| 11,722,502 | B1* | 8/2023 | Comeaux | G06N 3/086 705/318 |
| 11,895,264 | B2* | 2/2024 | Phatak | G06N 20/10 |
| 2007/0124246 | A1* | 5/2007 | Lawyer | G06Q 10/00 705/50 |
| 2007/0203826 | A1* | 8/2007 | Russell | G06Q 20/4016 705/38 |
| 2008/0270171 | A1* | 10/2008 | Price | G06Q 10/06 705/1.1 |
| 2008/0270303 | A1* | 10/2008 | Zhou | G06Q 20/40 705/44 |
| 2010/0051684 | A1* | 3/2010 | Powers | G06Q 20/4016 235/379 |
| 2013/0024361 | A1* | 1/2013 | Choudhuri | G06Q 40/02 705/39 |
| 2013/0080368 | A1* | 3/2013 | Nandy | G06Q 20/10 706/47 |
| 2014/0081652 | A1* | 3/2014 | Klindworth | G06Q 10/0635 705/2 |
| 2014/0089192 | A1* | 3/2014 | Boding | G06Q 20/4016 705/44 |
| 2020/0143371 | A1* | 5/2020 | Ranganathan | G06Q 20/3224 |
| 2022/0006899 | A1* | 1/2022 | Phatak | G06N 20/00 |
| 2022/0334946 | A1* | 10/2022 | Ganti | G06F 21/51 |
| 2022/0351216 | A1* | 11/2022 | Kramme | G06Q 20/24 |
| 2023/0147934 | A1* | 5/2023 | Eddin | G06Q 20/4016 705/64 |
| 2024/0259490 | A1* | 8/2024 | Hefetz | G06Q 20/407 |

OTHER PUBLICATIONS

Kalaiselvi et al., "Credit Card Fraud Detection Using Learning to Rank Approach," International Conference on Computation of Power, Energy, Information and Communication, 2018 (Year: 2018).*

* cited by examiner

100

DYNAMIC BEHAVIORAL PROFILING USING TRAINED MACHINE-LEARNING AND ARTIFICIAL-INTELLIGENCE PROCESSES

CROSS-REFERENCE TO RELATED APPLICATION

This application claims the benefit of priority under 35 U.S.C. § 119(e) to prior U.S. Application No. 63/255,293, filed Oct. 13, 2021, the disclosure of which is incorporated by reference herein to its entirety.

TECHNICAL FIELD

The disclosed embodiments generally relate to computer-implemented systems and processes that dynamically profile behavior using trained machine-learning or artificial-intelligence process.

BACKGROUND

Today, financial institutions provision a variety of financial products and services to customers, and monitor transactions involving these financial products or services to identify, and mitigate potential instances of fraudulent activity. In many instances, representatives of the financial institution inspected queues of transaction data associated with potentially fraudulent activity to identify, and flag, those transaction that represent actual instances of fraudulent activity.

SUMMARY

In some examples, an apparatus includes a memory storing instructions, a communications interface, and at least coupled to the memory and the communications interface. The at least one processor is configured to execute the instructions to obtain a data element associated with an exchange of data. The data element includes a first value of a parameter of the data exchange, and the data element may be disposed at a corresponding position within an alert queue. The at least one processor is further configured to execute the instructions to, based on the application of a trained machine-learning or artificial-intelligence process to an input dataset associated with the data element, generate behavioral profile data that includes a range of expected deviations from an expected value of the parameter during a temporal interval. The at least one processor is further configured to execute the instructions to, based on a determination that the range of expected deviations fails to include the first parameter value, perform operations that prioritize the position of the data element within the alert queue. The at least one processor is further configured to execute the instructions to transmit, to a device via the communications interface, a notification that includes the data element and information characterizing the prioritized position of the data element within the alert queue.

In other examples, a computer-implemented method includes obtaining, using at least one processor, a data element associated with an exchange of data. The data element includes a first value of a parameter of the data exchange, and the data element is disposed at a corresponding position within an alert queue. The computer-implemented method includes, based on an application of a trained machine-learning or artificial-intelligence process an input dataset associated with the data element, generating, using the at least one processor, behavioral profile data that includes a range of expected deviations from an expected value of the parameter during a temporal interval. The computer-implemented method includes, based on a determination that the range of expected deviations fails to include the first parameter value, performing operations, using the at least one processor, that prioritize the position of the data element within the alert queue. The computer-implemented method also includes, transmitting, using the at least one processor and to a device, a notification that includes the data element and information characterizing the prioritized position of the data element within the alert queue.

In various examples, a tangible, non-transitory computer-readable medium storing instructions that, when executed by at least one processor, causes the at least one processor to perform a method that includes obtaining a data element associated with an exchange of data. The data element includes a first value of a parameter of the data exchange, and the data element is disposed at a corresponding position within an alert queue. Based on an application of a trained machine-learning or artificial-intelligence process an input dataset associated with the data element, the method includes generating behavioral profile data that includes a range of expected deviations from an expected value of the parameter during a temporal interval. Based on a determination that the range of expected deviations fails to include the first parameter value, the method includes performing operations that prioritize the position of the data element within the alert queue. The method also includes transmitting, to a device, a notification that includes the data element and information characterizing the prioritized position of the data element within the alert queue.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed exemplary embodiments, as set forth in the accompanying claims.

DETAILED DESCRIPTION

Figure 1A:
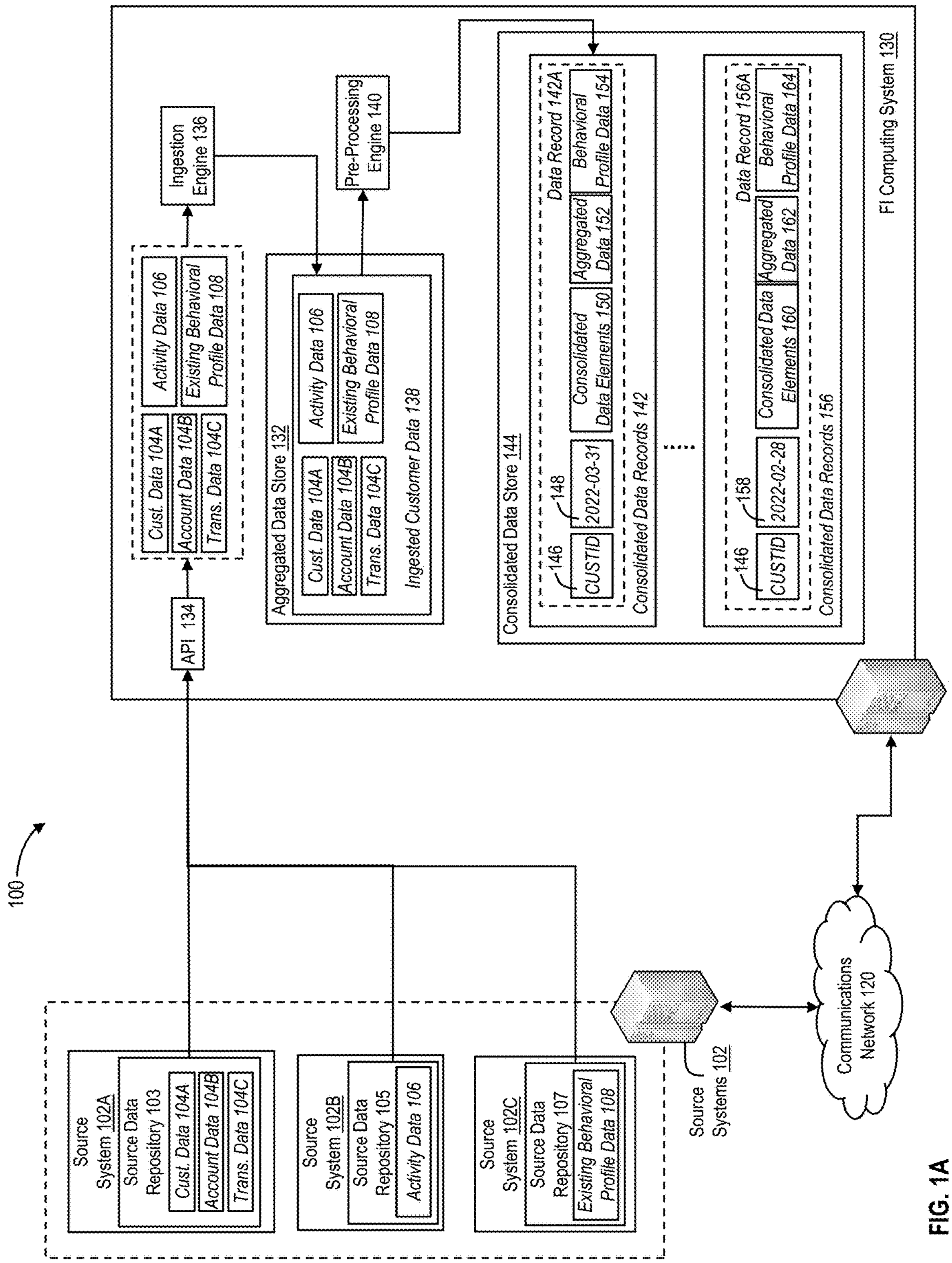
FIGS. 1A and 1B are block diagrams illustrating portions of an exemplary computing environment, in accordance with some exemplary embodiments.

Modern financial institutions offer a variety of financial products or financial services to their customers, both through in-person branch banking and through various digital channels. In some instances, computing systems operated by these financial institutions may maintain, within corresponding data repositories, elements of customer-specific data that identify and characterize the each these customers, interactions between these customers and the financial institution, and an engagement of these customers with not only the financial products or services provisioned by the financial institution, but also one or more access products that facilitate the customer interaction with the financial institution via corresponding digital channels. Further, decisions to provision one or more of the financial products or services to these customers, decisions to authorize an execution of transaction involving financial products held by these customers, and in some instances, decisions to authorize requested engagements between these customers and the access products provisioned by the financial institution, may be informed by corresponding elements of the customer-specific data.

By way of example, a financial institution may issue, to a particular customer, a financial product available to participate in exchanges of data involving corresponding counterparties, such as, but not limited to, a credit-card account available to fund transactions involving corresponding one of the counterparties, or a deposit account, such as a checking account, available to fund or receive proceeds from these transactions. The transactions may include, among other things, purchase transactions, bill-payment transactions, electronic funds transfer (EFT) transfers (e.g., payroll deposits, etc.), peer-to-peer (P2P) transfers or transactions, or real-time payment (RTP) transactions, and in some instances, the computing systems associated with the financial institution may receive, or intercept, transaction data identifying and characterizing a transaction initiated by, or involving, the particular customer and a corresponding one of the issued financial products, e.g., as a portion of a request for authorization received from a computing system associated with or operated by a payment processing network or payment rail. In some examples, and prior to authorizing the initiated transaction in accordance with portions of the received or intercepted data, the computing system of the financial institution may perform operations that parse the received or incepted data and determine whether the initiated transaction represents an instance of potential fraud involving the particular customer or the corresponding financial product.

Further, and as described herein, the financial institution may also provision one or more access products that facilitate interactions between the customers and the financial institution via corresponding digital channels, and examples of these access products include, but are not limited to mobile applications, web-based online banking platforms, or voice-based banking platforms accessible to the customers via corresponding computing devices or systems. In some instances, the computing systems of the financial institution may receive, via one of the provisioned access products, elements of request data that identify and characterize a requested interaction between the particular customer and the financial institution (e.g., based on data generated by a provisioned mobile application executed at a device operable by the particular customer, etc.). The requested interaction may include, among other things, a request to access elements of confidential data characterizing one or more financial products held by the particular customer (e.g. a balance or outstanding payment associated with a credit-card account, etc.), a request to modify one or more authentication credentials of the particular customer (e.g., a request to modify an alphanumeric password, etc.), or a request to modify an identifier of the customer device that participates in a two-factor authentication process (e.g., a request to update a telephone number of the customer device, etc.). In some instances, and prior to authorizing the requested interaction, the computing systems of the financial institution may also perform operations that parse the request data and determine whether the requested interaction represents an instance of potential fraud involving the particular customer or the access product.

To determine whether the initiated transaction, and additionally, or alternatively, the requested interaction, represents an instance of potential fraud, the computing systems of the financial institution may apply one or more predetermined fraud detection rules to respective elements of the transaction data and/or the request data. For example, the one or more predetermined fraud detection rules may specify that the initiated transaction represents an instance of potential fraud when a transaction value associated with the initiated transaction exceeds a predetermined, threshold transaction value. The one or more predetermined fraud detection rules may also specify that the initiated transaction represents an instance of potential fraud when a transaction velocity associated with the particular customer and/or the corresponding financial product (e.g., that reflects the initiated transaction) exceeds a predetermined threshold velocity, or that the requested interaction represents an instance of potential fraud when an interaction velocity associated with the particular customer and/or the corresponding access product (e.g., that reflects the requested interaction) exceeds a predetermined threshold velocity.

In some instances, described herein, the transaction velocity associated with the particular customer and/or the corresponding financial product may represent a number of discrete transactions involving the particular customer and/or the corresponding financial product initiated (or authorized and executed) across one or more temporal intervals, e.g., a temporal interval of one hour, twelve hours, twenty-four hours, etc. Further, the interaction velocity associated with the particular customer and/or the corresponding access product may represent a number of discrete, requested interactions with the financial institution that involve the particular customer and the corresponding access product during one or more temporal intervals, such as, but not limited to, the exemplary temporal intervals described herein.

The one or more predetermined fraud detection rules may also specify that the initiated transaction, or the requested interaction, represents an instance of potential fraud when a distance between a geographic location associated with the initiated transaction or the requested interaction (e.g., a geographic location of corresponding counterparty, a geographic location of the particular customer, etc.) and a geographic location associated with one or more prior, authorized transactions or interactions exceeds a predetermined threshold distance. The disclosed embodiments are, however, not limited to these exemplary, predetermined fraud detection rules, and on other instances, the computing systems of the financial institution may determine that the initiated transaction, or the requested interaction, represents an instance of potential fraud based an application of any additional, or alternate, predetermined rule to the respective elements of the transaction data and/or the request data that would be appropriate to the initiated transaction or the requested interaction.

Based on a determination that that initiated transaction, and additionally, or alternatively, the requested interaction, represents an instance of potential fraud, the computing systems of the financial institution may perform operations that suspend any subsequent authorization of a respective one of the initiated transaction or requested interaction, and that generate elements of alert data that identify and characterize the instance of potential fraud associated with the respective one of the initiated transaction or the requested interaction. The computing systems of the financial institution may also perform operations that prioritize, or rank, certain of the queued elements of alert data, which identify and characterize initiated transactions or requested interactions associated with instances of potential fraudulent activity, in accordance with one or more predetermined prioritization rules. By way of example, predetermined prioritization rules may prioritize, or rank, the queued elements of alert data associated with the initiated, and potentially fraudulent, transactions in accordance with an amount by which corresponding ones of the transaction values (e.g., as specified within elements of alert data) exceeds the predetermined, threshold transaction value described herein.

Additionally, in some examples, the predetermined prioritization rules may prioritize, or rank, the queued elements of alert data associated with the potentially fraudulent transactions and requested interactions based on an amount by which a corresponding transaction or interaction velocity exceeds the predetermined threshold transaction or interaction velocity described herein. In some instances, and through the application of the one or more predetermined prioritization rules to the queued elements of alert data associated with the potentially fraudulent transactions and requested interactions, the computing systems of the financial institution may re-order the queued elements of alert data in an attempt to prioritize those queued elements of alert data associated with initiated transactions or requested interactions that represent likely instances of actual fraudulent activity, e.g., for further review and analysis by representatives of the financial institution.

Further, the computing systems of the financial institution may perform operations that transmit a portion of the elements of alert data maintained within the alert queue, which identify and characterize initiated transactions and/or requested interaction that represent determined instances of potential fraud, to a device operable by a representative of the financial institution, e.g., in accordance with a predetermined schedule, such as, but not limited to, on an hourly or a daily basis. As described herein, the representative device may receive the portion of the elements of alert data, and may execute one or more application programs, such as a web browser, that presents the elements of alert data within one or more display screens of a digital interface, such as a browser window. In some instances, representative may review the presented elements of alert data associated with each of the initiated transactions or requested interactions associated with instances of potential fraud, and determine, based on personal experience or intuition, or based on one or more of the predetermined fraud detection rules (e.g., based on transaction value, transaction or interaction velocity, etc.), whether the potentially fraudulent initiated transaction or requested interaction represents an actual instance of fraudulent activity.

In some instances, existing processes prioritizing elements of alert data associated with potentially fraudulent transactions or interactions within a corresponding alert queue, which rely on predetermined, fraud detection rules and corresponding value, distance, or velocity threshold, and existing processes for detecting actual instances of fraudulent activity associated with these potentially fraudulent transactions or interactions, which rely on an intuition or an experience of a representative of the financial institution, may be incapable of accounting for time-varying changes in an expected transactional or spending behavior of the customers of the financial institution across multiple temporal intervals, much less for any time-varying changes in a behavior of these customers during interactions with corresponding access products throughout these temporal intervals. Further, many of the rule-based processes for prioritizing the elements of alert data, and many of the subjective processes for detecting actual instances of fraudulent activity, may also be incapable of assessing whether a potentially fraudulent transaction involving a customer, or a potentially fraudulent non-financial interaction between the customer and the financial institution, represents an expected, and as such, acceptable, deviation from an expected behavior of that customer during a corresponding temporal interval.

In some examples, described herein, the computing systems of the financial institution may perform operations that train adaptively a machine-learning or artificial-intelligence process to predict, for a customer of the financial institution, an expected, customer-specific value of one or more targeted transaction or interaction parameters that characterize a behavior of the customer during a temporal interval, and additionally, or alternatively, a range of expected deviation from each of these customer-specific values of the transaction or interaction parameters during the temporal interval, using training datasets associated with a first prior temporal interval (e.g., a "training" interval), and using validation datasets associated with a second, and distinct, prior temporal interval (e.g., an out-of-time "validation" interval). As described herein, the training and validation datasets may include, but are not limited to, values of adaptively selected features obtained, extracted, or derived from the maintained elements of customer-specific data that identify and characterize the each these customers, interactions between these customers and the financial institution, and an engagement of these customers with not only the financial products or services provisioned by the financial institution, but also one or more access products that facilitate the customer interaction with the financial institution via corresponding digital channels.

The machine-learning or artificial-intelligence process may, for example, include an ensemble or decision-tree process, such as a gradient-boosted decision-tree process (e.g., an XGBoost process). Further, in some examples, the machine-learning or artificial-intelligence process may include, but are not limited to, a clustering process, an unsupervised learning process (e.g., a k-means algorithm, a mixture model, a hierarchical clustering algorithm, etc.), a semi-supervised learning process, a supervised learning process, or a statistical process (e.g., a multinomial logistic regression model, etc.). The trained machine-learning or artificial-intelligence process may also include, among other things, a random decision forest, an artificial neural network, a deep neural network, or an association-rule process (e.g., an Apriori algorithm, an Eclat algorithm, or an FP-growth algorithm).

Further, in some instances, the expected, customer-specific values for the targeted transactional or interaction parameters, and additionally, or alternatively, the expected deviations from these expected, customer-specific values, may establish collectively a behavioral profile for the customer. The behavioral profile for the customer may, for example, characterize an expected transaction- or interaction-specific behavior of the customer during the temporal interval, and in some instances, may establish a "normal" or "baseline" behavior of that customer. Further, the expected deviations specified within the behavioral profile for the customer may establish, individually or collectively, a magnitude of a variation from the expected behavior that would be consistent with that expected behavior, and would not represent an instance of anomalous behavior inconsistent with the expected values of the targeted transactional or interaction parameters, e.g., as specified within the behavioral profile of that customer.

Certain of these exemplary processes, which adaptively train and validate a machine-learning or artificial-intelligence process using customer-specific training and validation datasets associated with respective training and validation periods, and which apply the trained and validated machine-learning or artificial-intelligence process to additional customer-specific input datasets, may enable the one or more of the FI computing systems to predict, in real-time, expected customer-specific values of a targeted set of transactional or interaction parameters during a temporal interval, and the expected deviations from these customer-specific values of the transactional or interaction parameters during the temporal interval. These exemplary processes described herein in addition to, or as an alternate to, existing queue-prioritization and fraud-detection processes that rely on predetermined prioritization or fraud-detection rules, or on an intuition or an experience of a representative of the financial institution, and the implementation of one or more of these exemplary processes may enhance or "boost" an effectiveness of these existing queue-prioritization and fraud-detection processes in differentiating between instances of potential fraud that fall within the expected deviations of the normal or baseline behavior of the customer (and as such, fail to represent instances of actual fraud), and those instances of potential fraud that fall outside the expected deviations of the normal or baseline behavior of the customer during the predetermined temporal interval (as such, represent instances of actual fraud involving the provisioned financial products or access products).

Figure 1B:
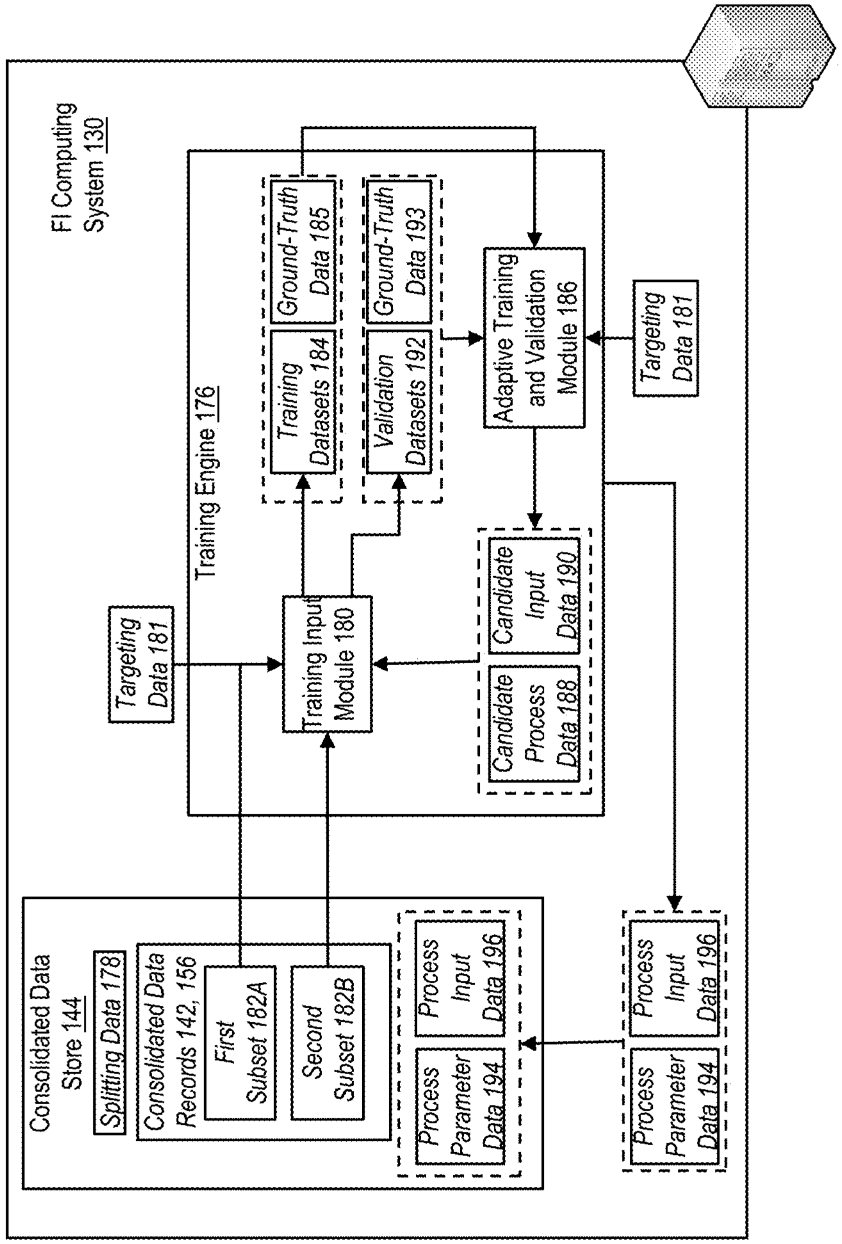

A. Exemplary Processes for Adaptively Training Machine Learning or Artificial Intelligence Processes within Distributed Computing Environments FIGS. 1A and 1B illustrate components of an exemplary computing environment 100, in accordance with some exemplary embodiments. For example, as illustrated in FIG. 1A, computing environment 100 may include one or more source systems 102, such as, but not limited to, source system 102A, source system 102B, source system 102C, and one or more computing systems associated with, or operated by, a financial institution, such as a financial institution (FI) computing system 130, In some instances, each of source systems 102 (including source systems 102A, source system 102B, and source system 102C, etc.) and FI computing system 130, may be interconnected through one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some examples, each of source systems 102 (including source systems 102A, source system 102B, and source system 102C) and FI computing system 130 may represent a computing system that includes one or more servers and tangible, non-transitory memories storing executable code and application modules. Further, the one or more servers may each include one or more processors, which may be configured to execute portions of the stored code or application modules to perform operations consistent with the disclosed embodiments. For example, the one or more processors may include a central processing unit (CPU) capable of processing a single operation (e.g., a scalar operations) in a single clock cycle. Further, each of source systems 102 (including source systems 102A, source system 102B, and source system 102C) and FI computing system 130 may also include a communications interface, such as one or more wireless transceivers, coupled to the one or more processors for accommodating wired or wireless internet communication with other computing systems and devices operating within computing environment 100.

Further, in some instances, source systems 102 (including source systems 102A, source system 102B, and source system 102C) and FI computing system 130 may each be incorporated into a respective, discrete computing system. In additional, or alternate, instances, one or more of source systems 102 (including source system 102A and source system 102B) and FI computing system 130 may correspond to a distributed computing system having a plurality of interconnected, computing components distributed across an appropriate computing network, such as communications network 120 of FIG. 1A. For example, FI computing system 130 may correspond to a distributed or cloud-based computing cluster associated with and maintained by the financial institution, although in other examples, FI computing system 130 may correspond to a publicly accessible, distributed or cloud-based computing cluster, such as a computing cluster maintained by Microsoft Azure™, Amazon Web Services™, Google Cloud™, or another third-party provider.

In some instances, FI computing system 130 may include a plurality of interconnected, distributed computing components, such as those described herein (not illustrated in FIG. 1A), which may be configured to implement one or more parallelized, fault-tolerant distributed computing and analytical processes (e.g., an Apache Spark™ distributed, cluster-computing framework, a Databricks™ analytical platform, etc.). Further, and in addition to the CPUs described herein, the distributed computing components of FI computing system 130 may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle. Through an implementation of the parallelized, fault-tolerant distributed computing and analytical protocols described herein, the distributed computing components of FI computing system 130 may perform any of the exemplary processes described herein, to ingest elements of data associated with the customers of the financial institution, including elements of customer-profile, transaction, and non-financial interaction data associated with these customers, to preprocess the ingested data elements, and to store the preprocessed data elements within an accessible data repository (e.g., within a portion of a distributed file system, such as a Hadoop distributed file system (HDFS)).

Further, and through an implementation of the parallelized, fault-tolerant distributed computing and analytical protocols described herein, the distributed components of FI computing system 130 may perform operations in parallel that not only train adaptively a machine-learning or artificial-intelligence process (e.g., the gradient-boosted, decision-tree process described herein) using corresponding training and validation datasets extracted from temporally distinct subsets of the preprocessed data elements, but also apply the adaptively trained machine-learning or artificial-intelligence process to customer-specific input datasets and generate, in real time, elements of behavioral profile data indicative of an expected, customer-specific value of one or more targeted transaction or interaction parameters that characterize a behavior of corresponding ones of the customers during a temporal interval, and additionally, or alternatively, a range of expected deviations from each of the expected customer-specific values of the targeted transaction or interaction parameters during the temporal interval.

As described herein, the expected, customer-specific values for the targeted transaction or interaction parameters during the temporal interval, and additionally, or alternatively, the ranges of expected deviations from these customer-specific values of the transaction or financial interaction parameters (e.g., as specified within the elements of behavioral profile data), may establish collectively a behavioral profile for corresponding ones of the customers, which may be valid throughout the temporal interval. By way of example, and for a particular customer of the financial institution, the elements of behavioral profile data characterize an expected behavior of the particular customer during the temporal interval, and the ranges of expected deviations specified within the elements of behavioral profile data for the particular customer may establish, individually or collectively, a magnitude of a variation from the expected behavior that would be consistent with that expected behavior, and that would not represent an instance of anomalous behavior inconsistent with the expected behavior.

Further, when coupled to many existing, rule-based processes for prioritizing queues of potentially fraudulent transactions, or existing, subjective processes categorizing a potentially fraudulent transaction as an instance of actual fraud, the elements of behavioral profiling data characterizing the particular customer of the financial institution may enhance or “boost” an effectiveness of these existing queue-prioritization and fraud-detection processes in differentiating between instances of potential fraud that fall within the expected deviations of the normal or baseline behavior of the particular customer during the temporal interval (and as such, fail to represent instances of actual fraud involving the financial products or access products provisioned by the financial institution), and those instances of potential fraud that fall outside the expected deviations of the normal or baseline behavior of the particular customer during the temporal interval, and as such, represent instances of actual fraud involving the provisioned financial products or access products. The implementation of the parallelized, fault-tolerant distributed computing and analytical protocols described herein across the one or more GPUs or TPUs included within the distributed components of FI computing system 130 may, in some instances, accelerate the training, and the post-training deployment, of the machine-learning or artificial-intelligence process when compared to a training and deployment of the machine-learning or artificial-intelligence process across comparable clusters of CPUs capable of processing a single operation per clock cycle.

Referring back to FIG. 1A, each of source systems 102 may maintain, within corresponding tangible, non-transitory memories, a data repository that includes confidential data associated with the customers of the financial institution. For example, internal source system 102A may be associated with, or operated by, the financial institution, and may maintain, within the corresponding one or more tangible, non-transitory memories, a source data repository 103 that includes one or more elements of customer data 104A, account data 104B, and transaction data 104C. In some instances, customer data 104A may include a plurality of data records associated with, and characterizing, corresponding ones of the customers of the financial institution. By way of example, and for a particular customer of the financial institution, the data records of customer data 104A may include, but are not limited to, one or more unique customer identifiers (e.g., an alphanumeric character string, such as a login credential, a customer name, etc.), residence data (e.g., a street address, etc.), other elements of contact data (e.g., a mobile number, an email address, etc.), values of demographic parameters that characterize the particular customer (e.g., ages, occupations, marital status, etc.), and other data characterizing the relationship between the particular customer and the financial institution. Further, customer data 104A may also include, for the particular customer, multiple data records that include corresponding elements of temporal data (e.g., a time or date stamp, etc.), and the multiple data records may establish, for the particular customer, a temporal evolution in the customer residence or a temporal evolution in one or more of the demographic parameter values.

Account data 1048 may also include a plurality of data records that identify and characterize one or more financial products or financial instruments issued by the financial institution to corresponding ones of the customers. For example, the data records of account data 104B may include, for each of the financial products issued to corresponding ones of the customers, one or more identifiers of the financial product or instrument (e.g., an account number, expiration data, card-security-code, etc.), one or more unique customer identifiers (e.g., an alphanumeric character string, such as a login credential, a customer name, etc.), and additional information characterizing a balance or current status of the financial product or instrument (e.g., payment due dates or amounts, delinquent accounts statuses, etc.). Examples of these financial products or financial instruments may include, but are not limited to, one or more deposit accounts issued to corresponding ones of the customers (e.g., a savings account, a checking account, etc.), one or more brokerage or retirements accounts issued to corresponding ones of the customers by the financial institutions, and one or more secured credit products issued to corresponding ones of the customers by the financial institution. The financial products or financial instruments may also include one or more credit products issued to corresponding ones of the customers by the financial institution, and examples of these unsecured credit products may include, but are not limited to, a credit-card account or a line-of-credit.

Transaction data 104C may include data records that identify, and characterize one or more initiated, settled, or cleared transactions involving respective ones of the customers and corresponding ones of the financial products or instruments held by the customers. Examples of these transactions include, but are not limited to, purchase transactions, bill-payment transactions, electronic funds transfers (e.g., payroll deposits, etc.), currency conversions, purchases of securities, derivatives, or other tradeable instruments, electronic funds transfer (EFT) transactions, peer-to-peer (P2P) transfers or transactions, or real-time payment (RTP) transactions. For instance, and for a transaction involving a corresponding customer and corresponding financial product or instrument, the data records of transaction data 104C may include, but are limited to, a customer identifier associated with the corresponding customer (e.g., the alphanumeric character string described herein, etc.), temporal data characterizing a date and/or time associated with the particular transaction, a counterparty identifier associated with a counterparty to the particular transaction (e.g., an alphanumeric character string, a counterparty name, a standard industrial classification (SIC) code, etc.), an identifier of the corresponding financial product or instrument (e.g., a tokenized account number, expiration data, card-security-code, etc.), geographic data characterizing the particular customer and/or the counterparty (e.g., a geographic position of a computing system or device of the customer, a geographic location associated with the counterparty, etc.), and/or values of one or more parameters of the particular transaction (e.g., a transaction amount, an identifier of a good or service involved in the particular transaction, etc.).

Further, and in addition to the data records that identify, and characterize one or more initiated, settled, or cleared transactions involving respective ones of the customers and the corresponding ones of the financial products or instruments, transaction data 104C may also include data records that identify, and characterize one or more initiated transactions that represent instances of actual fraud involving the respective ones of the customer or the corresponding financial instruments of products held by these customers (e.g., as determined by one or more computing systems of the financial institution (e.g., FI computing system 130, etc.), or by a representative of the financial institution, using any of the exemplary processes described herein. For instance, and for an initiated transaction that represents an instance of actual fraud, the data records of transaction data 104C may include, but are limited to, a customer identifier associated with a corresponding customer involved in the initiated transaction (e.g., the alphanumeric character string described herein, etc.), temporal data characterizing a date and/or time associated with the initiated transaction, a counterparty identifier associated with a counterparty to the initiated transaction (e.g., an alphanumeric character string, a counterparty name, a standard industrial classification (SIC) code, etc.), an identifier of a corresponding financial product or instrument involved in the transaction and subject to the actual fraud (e.g., a tokenized account number, expiration data, card-security-code, etc.), geographic data characterizing the particular customer and/or the counterparty (e.g., a geographic position of a computing system or device of the customer, a geographic location associated with the counterparty, etc.), and/or values of one or more parameters of the initiated transaction (e.g., a transaction amount, an identifier of a good or service involved in the particular transaction, etc.).

The disclosed embodiments are, however, not limited to these exemplary elements of customer data 104A, account data 104B, or transaction data 104C. In other instances, source system 102A may maintain, within source data repository 103, any addition, or alternate, elements of customer data 104A, account data 104B, or transaction data 104C that identify and characterize the customers of the financial institution, the interactions between the customer and financial institution, and in some instances, interactions between the customers and corresponding products or services offered by the financial institution. Further, although stored in FIG. 1A within source data repository 103 maintained within the tangible, non-transitory memories of source system 102A, the exemplary elements of customer data 104A, account data 104B, or transaction data 104C may be maintained by any additional or alternate computing system associated with the financial institution, including, but not limited to, within one or more tangible, non-transitory memories of FI computing system 130.

Source system 102B may also be associated with, or operated by, the financial institution, and maintain, within the corresponding one or more tangible, non-transitory memories, a source data repository 105 that includes one or more elements of activity data 106. In some instances, activity data 106 may include data records that identify and characterize one or more requested and authorized (e.g., "granted") interactions between the financial institution and the customers of the financial institution, and each of the interactions may be associated with an engagement between a corresponding one of the customers of the financial institution and an access product provisioned by the financial institution, e.g., via a corresponding digital channel. Examples of these access products include, but are not limited to mobile applications (e.g., mobile banking applications), web-based online banking platforms, or voice-based banking platforms provisioned by the financial institution (e.g., via operations performed by FI computing system 130, etc.) and accessible to the customers via corresponding computing devices or systems.

The requested and authorized interaction may include, among other things, a request by a particular customer to obtain a mobile application associated with the financial institution, or a request by the particular customer to register for access to a digital portal provisioned by the mobile application or by a web-based, mobile banking platform associated with the financial institution. The requested and authorized interactions may also include, but are not limited to, a request to access elements of confidential data characterizing one or more financial products held by the particular customer via an executed mobile application (e.g. a balance or outstanding payment associated with a credit-card account, etc.), a request to modify one or more authentication credentials (e.g., a request to modify an alphanumeric password, etc.), or a request to modify an identifier of the customer device that participates in a two-factor authentication process (e.g., a request to update a telephone number of the customer device, etc.). The disclosed embodiments are, however, not limited to these exemplary interactions, and in other instances, the requested and authorized interaction may any additional, or alternate, interaction between the customers of the financial institution and corresponding ones of the provisioned access products, as described herein.

By way of example, and for a requested and authorized interaction between the financial institution and a particular customer, the elements of activity data 106 may include, but are not limited to, a customer identifier of the particular customer (e.g., an alphanumeric identifier or login credential, a customer name, etc.), a temporal identifier associated with the interaction (e.g., a date and/or time at which the particular customer initiated the interaction, etc.), data characterizing an access product that facilitates the requested and authorized interaction (e.g., an alphanumeric identifier of the mobile application, web-based online banking platform, or voice-based banking platform, etc.), geographic data characterizing the interaction (e.g., a geographic position of a computing system or device of the customer, etc.), and data identifying and characterizing the requested and authorized interaction (e.g., an identifier of an activity associated with the requested and authorized interaction, e.g., a balance request, a request to modify an authentication credential or contact information, etc.).

Further, and in addition to the data records that identify and characterize requested and authorized interactions between the financial institution and corresponding customers of the financial institution, activity data 106 may also include data records that identify, and characterize one or more requested interactions that represent instances of actual fraudulent activity involving the corresponding ones of the customers and/or corresponding ones of the access products (e.g., as determined by one or more computing systems of the financial institution (e.g., FI computing system 130, etc.), or by a representative of the financial institution, using any of the exemplary processes described herein. For instance, for a requested interaction that represents an actual instance of fraudulent activity, the data records of activity data 106 may include, but are limited to, one or more of the exemplary data elements described herein.

Source system 102C may also be associated with, or operated by, the financial institution, and maintain, within the corresponding one or more tangible, non-transitory memories, a source data repository 107 that includes one or more elements of existing behavioral profile data 108, which include elements of data that establish a behavioral profile associated with, and characterizing, one or more of customers of the financial institutions during one, or more, prior temporal intervals. By way of example, the elements of existing behavioral profile data 108 for a particular customer of the financial institution during a prior temporal interval may include, among other things, a customer identifier of the particular customer (e.g., an alphanumeric identifier or login credential, a customer name, etc.), a temporal identifier of the prior temporal interval associated with the existing behavioral profile (e.g., a date at which FI computing system 130 derived the existing behavioral profile, an expiration of a period of validity of the existing behavioral profile, etc.), and data specifying an expected, customer-specific value of one or more targeted transaction or interaction parameters that characterize a behavior of the particular customer during the prior temporal interval, and a range of expected deviations from each of these customer-specific values of the transaction or interaction parameters during the prior temporal interval.

In some instances, the expected values of the transaction parameters, and the corresponding expected deviations, may be parameterized on a temporal basis (e.g., across various dates or times during the prior temporal interval, etc.), on a counterparty-specific basis (e.g., across various merchants or counterparties involved in corresponding transactions during the prior temporal intervals), on a product- or service-specific basis (e.g., across various products or services involved in the corresponding transactions), on a payment-instrument-specific basis (e.g., across various payment instrument available to fund the corresponding transactions, etc.), and additionally, or alternatively, on combinations of these bases. By way of example, and for transactions initiated by the particular customer of the financial institution at a corresponding merchant counterparty (e.g., identified by an alphanumeric identifier or an SIC code, etc.), the elements of existing behavioral profile data 108 may include an expected transaction value, and an range of expected deviations from that expected transaction value, for the transactions initiated during one, or more, distinct temporal intervals during a calendar day (e.g., discrete, four-hour intervals during the calendar day, etc.), involving one, or more, distinct products or services offered by the corresponding merchant (e.g., associated with corresponding UPCs, etc.), and additionally, or alternatively, funded by one, or more, distinct financial products held by the particular customer (e.g., associated with tokenized account numbers, etc.).

Additionally, in some examples, the elements of existing behavioral profile data 108 may include, for the particular customer during the prior temporal interval, and expected value of a derived parameter characterizing transactions initiated at the corresponding merchant counterparty, and an range of expected deviations from that expected derived parameter value, during one, or more, distinct temporal intervals during a calendar day (e.g., discrete, four-hour intervals during the calendar day, etc.), and additionally, or alternatively, involving one or more products or services offered by the corresponding merchant (e.g., associated with corresponding UPCs, etc.). Examples of these derived parameter values may include, but are not limited to, a velocity of the transactions initiated by the particular customer of the financial institution, which may be establish by FI computing system 130 (or source system 102C) using any of the exemplary processes described herein.

Further, the expected values of the interaction parameters, and the corresponding expected deviations, may be parameterized on a temporal basis (e.g., across various dates or times during the prior temporal interval, etc.), on the basis of an involved access product provisioned by the financial institution (e.g., a mobile application, web-based online banking platform, or voice-based banking platform, etc.), on a location-specific basis (e.g., geographic position of a computing device or system associated with a requested interaction), on the basis of an interaction type (e.g., requests to obtain an access product, requests to access confidential customer data, such as a balance request, or requests to modify an authentication credential or contact information, etc.), and additionally, or alternatively, on combinations of these bases. For example, and for interactions requested by particular customer of the financial institution, involving a corresponding access product (e.g., a mobile application), and being characterized by a corresponding transaction type (e.g., a balance request), the elements of existing behavioral profile data 108 may include an expected interaction time and a range of expected deviations from that expected interaction time of the requested interactions, and in some instances, and expected interaction location of the requested interactions and an expected geographic deviation from that expected interaction location.

In other examples, the elements of existing behavioral profile data 108 may include an expected value of a derived parameter characterizing interactions requested by the particular customer, and an expected range of deviations from that derived parameter value, during one, or more, distinct temporal intervals during a calendar day, e.g., discrete, four-hour intervals during the calendar day, etc. Examples of these derived parameter values may include, but are not limited to, a velocity of the requested interactions involving corresponding ones of the access products described herein (e.g., the mobile application, web-based online banking platform, or voice-based banking platform, etc.) and additionally, or alternatively, associated with corresponding ones of the interaction types described herein type (e.g., the requests to obtain an access product, the requests to access confidential customer data, or the requests to modify an authentication credential or contact information, etc.).

The disclosed embodiments are, however, not limited to these exemplary transaction or interaction parameters, or to these exemplary parameterizations of these transaction or interaction parameters. In other instances, the elements of existing behavioral profile data 108 may include expected values of any additional, or alternate, transaction or interaction parameters, and expected deviations from the expected values, that characterize a transaction- or interaction-specific behavior of customers of the financial institution during corresponding ones of the prior temporal intervals. Further, these expected values, and the corresponding expected deviations, may be parameterized on any additional, or alternate, bases consistent with, and appropriate to, the initiated transactions or the requested interactions.

Referring back to FIG. 1A, FI computing system 130 may perform operations that establish and maintain one or more centralized data repositories within corresponding ones of the tangible, non-transitory memories. For example, as illustrated in FIG. 1A, FI computing system 130 may establish an aggregated data store 132, which maintains, among other things, elements of the customer, account, transaction, interaction, and existing behavioral profile data associated with one or more of the customers of the financial institution, which may be ingested by FI computing system 130 (e.g., from one or more of source systems 102) using any of the exemplary processes described herein. Aggregated data store 132 may, for instance, correspond to a data lake, a data warehouse, or another centralized repository established and maintained, respectively, by the distributed components of FI computing system 130, e.g., through a Hadoop™ distributed file system (HDFS).

For example, FI computing system 130 may execute one or more application programs, elements of code, or code modules that, in conjunction with the corresponding communications interface, establish a secure, programmatic channel of communication with each of source systems 102, including source system 102A, source system 102B, and source system 102C, across communications network 120, and may perform operations that access and obtain all, or a selected portion, of the elements of customer, account, transaction, activity, and/or existing behavioral profile data maintained by corresponding ones of source systems 102. As illustrated in FIG. 1A, internal source system 102A may perform operations that obtain all, or a selected portion, of customer data 104A, account data 1048, and/or transaction data 104C, from source data repository 103, and transmit the obtained portions of customer data 104A, account data 104B, and/or transaction data 104C across communications network 120 to FI computing system 130.

Source system 102B may also perform operations that obtain all, or a selected portion, of activity data 106 from source data repository 105, and transmit the obtained portions of activity data 106 across communications network 120 to FI computing system 130. Further, source system 102C may perform operations that obtain all, or a selected portion, of existing behavioral profile data 108 from source data repository 107, and transmit the obtained portions of existing behavioral profile data 108 across communications network 120 to FI computing system 130. In some instances, each of source systems 102, including source systems 102A, 102B, and 102C, may perform operations that transmit respective portions of customer data 104A, account data 104B, transaction data 104C, activity data 106, and/or existing behavioral profile data 108 across communications network 120 to FI computing system 130 in batch form and in accordance with a predetermined temporal schedule (e.g., on a daily basis, on a monthly basis, etc.), or in real-time on a continuous, streaming basis.

A programmatic interface established and maintained by FI computing system 130, such as application programming interface (API) 134, may receive the portions of customer data 104A, account data 104B, and/or transaction data 104C from source system 102A, the portions of activity data 106 from source system 102B, and the portions of existing behavioral profile data 108 from source system 102C. As illustrated in FIG. 1A, API 134 may route the portions of customer data 104A, account data 104B, transaction data 104C, activity data 106, and/or existing behavioral profile data 108 to an ingestion engine 136 (e.g., collectively, elements of interaction data) executed by the one or more processors of FI computing system 130. In some instances, the portions of customer data 104A, account data 104B, transaction data 104C, activity data 106, and/or existing behavioral profile data 108 may be encrypted via a corresponding encryption key (e.g., a public cryptographic key of FI computing system 130), and executed ingestion engine 136 may perform operations that decrypt each of the encrypted portions of customer data 104A, account data 104B, transaction data 104C, activity data 106, and/or existing behavioral profile data 108 using a corresponding decryption key, e.g., a private cryptographic key associated with FI computing system 130. Executed ingestion engine 136 may also perform operations that store the portions of customer data 104A, account data 104B, transaction data 104C, activity data 106, and/or existing behavioral profile data 108 within aggregated data store 132, e.g., as ingested customer data 138.

In other instances, not illustrated in FIG. 1A, executed ingestion engine 136 may implement one or more robotic process automation (RPA) operations that request, and receive one or more portions of customer data 104A, account data 104B, transaction data 104C, activity data 106, and/or existing behavioral profile data 108 from respective ones of source systems 102A, 102B, and 102C. By way of example, source systems 102A, 102B, and 102C may each execute one or more respective application programs (not illustrated in FIG. 1A). In some instances, an application front-end of the application program executed by source system 102A may be exposed to FI computing system 130 via a first graphical user interface (GUI), and an application back-end of the application program executed by source system 102A may access corresponding elements of customer data 104A, account data 104B, and/or transaction data 104C (e.g., as maintained within source data repository 103) based on commands generated by the application front-end in response to interaction with the first GUI. Further, the application back-end of the application program executed by source system 102A may perform any of the exemplary processes described herein to selectively provision, or deny, requests to access to the elements of customer data 104A, account data 104B, and/or transaction data 104C received by the application front-end, e.g., based on input to the interface elements of the corresponding GUI.

An application front-end of the application program executed by source system 102B may also be exposed to FI computing system 130 via a second GUI, and an application back-end of the application program executed by source system 102B may access corresponding elements of activity data 106 (e.g., as maintained within source data repository 105) based on commands generated by the application front-end in response to interaction with the second GUI. Further, the application back-end of the application program executed by source system 102B may perform any of the exemplary processes described herein to selectively provision, or deny, requests to access to the elements of activity data 106 received by the application front-end, e.g., based on input to the interface elements of the second GUI.

Further, an application front-end of the application program executed by source system 102C may also be exposed to FI computing system 130 via a third GUI, and an application back-end of the application program executed by source system 102C may access corresponding elements of existing behavioral profile data 108 (e.g., as maintained within source data repository 107) based on commands generated by the application front-end in response to interaction with the third GUI. Further, the application back-end of the application program executed by source system 102B may perform any of the exemplary processes described herein to selectively provision, or deny, requests to access to the elements of existing behavioral profile data 108 received by the application front-end, e.g., based on input to the interface elements of the third GUI.

In some instances, executed ingestion engine 136 may perform operations that instantiate one or more virtual machines, and that provision, to the instantiated virtual machines, elements of object information and processing logic that, when processed by the instantiated virtual machines, cause the instantiated virtual machines to establish corresponding programmatic software robots (e.g., "bots") that interact with the first. Second, and third GUIs exposed by the executed application front-ends of corresponding ones of source systems 102A, 102B, and 102C. Further, executed ingestion engine 136 may also provision, to each of the instantiated virtual machines, scheduling data that specifies a predetermined temporal schedule for initiating the exemplary, RPA-based processes described herein by corresponding ones of the executed programmatic bots, e.g., at a predetermined time on a monthly, weekly, or daily basis.

By way of example, and in accordance with the predetermined schedule on a particular business day (e.g., at 9:00 a.m. on Mar. 31, 2022), each of the executed programmatic bots may perform operations, consistent with the elements of processing logic, that establish communications with a respective one source systems 102A, 102B, and 102C across communications network 120. In some instances, a first one of the executed programmatic bots may perform operations, consistent with the elements of processing logic, that cause an executable object (e.g., generated based on portions of the provisioned object information) to access the first GUI exposed by the executed application front-end of source system 102A, a second one of the executed programmatic bots may perform similar operations, consistent with the elements processing logic, that cause an additional executable object (e.g., also generated based on portions of the provisioned object information) to access the second GUI exposed by the executed application front-end of source system 102B, and a third one of the executed programmatic bots may perform similar operations, consistent with the elements processing logic, that cause a further executable object (e.g., generated based on portions of the provisioned object information) to access the third GUI exposed by the executed application front-end of source system 102C. Further, the first, second, and third executed programmatic bots may perform any of the exemplary processes described herein to provision, to corresponding ones of first, second, and third GUIs, one or more elements of credential data associated with FI computing system 130.

Based upon a successful authentication of the elements of credential data by the executed application program at source system 102A, the first executed programmatic bot may perform any of the exemplary processes described herein to provide, as input to the first GUI, information that requests all, or a selected portion, of customer data 104A, account data 104B, and/or transaction data 104C, from source data repository 103. For example, the first executed programmatic bot may generate input data that includes an identifier of the requested portions of customer data 104A, account data 104B, and/or transaction data 104C, and in some instances, an identifier of the financial institution (e.g., a cryptogram, hash value, or digital token, etc.), and FI computing system 130 may transmit the input data across communications network 120 to source system 102A, e.g., as additional input to the first GUI. In some instances, a format or structure of the input data, and the actions implemented by the first executed programmatic bot during interaction with the first GUI, may be consistent with portions of the provisioned object information, which identifies and characterizes the interface elements displayed within display screens of the first GUI.

Source system 102A may receive the input data, and the executed application front-end may process the received input data provisioned to the first GUI, may generate a corresponding query for the requested portions of customer data 104A, account data 104B, and/or transaction data 104C maintained within source data repository 103, and may provide the corresponding query as an input to executed application back-end. The executed application back-end may perform operations that access source data repository 103, and based on the corresponding query, the executed application back-end may access and obtain the requested portions of customer data 104A, account data 104B, and/or transaction data 104C from source data repository 103. The executed application back-end also perform operations that generate a response to query and that package the requested portions of customer data 104A, account data 104B, and/or transaction data 104C into the response, which source system 102A may transmit across communications network 120 to FI computing system 130.

Further, and based upon a successful authentication of the elements of credential data by the executed application program at source system 102B, the second executed programmatic bot may perform any of the exemplary processes described herein to provide, as input to the second GUI, information that requests all, or a selected portion, of activity data 106 from source data repository 105. For example, the second executed programmatic bot may generate input data that includes an identifier of the requested portions of activity data 106 and/or existing behavioral profile data 108, and in some instances, an identifier of the financial institution (e.g., a cryptogram, hash value, or digital token, etc.), and FI computing system 130 may transmit the input data across communications network 120 to source system 102B, e.g., as additional input to the second GUI. In some instances, a format or structure of the input data, and the actions implemented by the second executed programmatic bot during interaction with the second GUI, may be consistent with portions of the provisioned object information, which identifies and characterizes the interface elements displayed within display screens of the second GUI.

Source system 102B may receive the input data, and the executed application front-end may process the received input data provisioned to the second GUI, may generate a corresponding query for the requested portions of activity data 106 and/or existing behavioral profile data 108 maintained within source data repository 105, and may provide the corresponding query as an input to executed application back-end. The executed application back-end may perform operations that access source data repository 105, and based on the corresponding query, the executed application back-end may access and obtain the requested portions of activity data 106. The executed application back-end may also perform operations that generate a response to query and that package the requested portions of activity data 106 into the response, which source system 102B may transmit across communications network 120 to FI computing system 130.

Additionally, and based upon a successful authentication of the elements of credential data by the executed application program at source system 102C, the third executed programmatic bot may perform any of the exemplary processes described herein to provide, as input to the third GUI, information that requests all, or a selected portion, of existing behavioral profile data 108 from source data repository 107. For example, the second executed programmatic bot may generate input data that includes an identifier of the requested portions of existing behavioral profile data 108, and in some instances, an identifier of the financial institution (e.g., a cryptogram, hash value, or digital token, etc.), and FI computing system 130 may transmit the input data across communications network 120 to source system 102C, e.g., as additional input to the third GUI. In some instances, a format or structure of the input data, and the actions implemented by the third executed programmatic bot during interaction with the third GUI, may be consistent with portions of the provisioned object information, which identifies and characterizes the interface elements displayed within display screens of the third GUI.

Source system 102C may receive the input data, and the executed application front-end may process the received input data provisioned to the third GUI, may generate a corresponding query for the requested portions of existing behavioral profile data 108 maintained within source data repository 107, and may provide the corresponding query as an input to executed application back-end. The executed application back-end may perform operations that access source data repository 107, and based on the corresponding query, the executed application back-end may access and obtain the requested portions of existing behavioral profile data 108. The executed application back-end may also perform operations that generate a response that includes the requested portions of existing behavioral profile data 108, which source system 102C may transmit across communications network 120 to FI computing system 130.

As described herein, FI computing system 130 may receive each of the responses from source systems 102A, 102B and 102C, and the first, second, and third executed programmatic bots may perform operations that parse respective ones of the response to obtain the requested portions of customer data 104A, account data 104B, transaction data 104C, activity data 106, and/or existing behavioral profile data 108. In some instances, each of the responses may structure, and transmitted, in accordance with one or more communication protocols, such as HyperText Transfer Protocol (HTTP) or Hypertext Transfer Protocol Secure (HTTPS), and executed ingestion engine 136 may perform any of the exemplary processes described herein to store the portions of customer data 104A, account data 104B, transaction data 104C, activity data 106, and/or existing behavioral profile data 108 within aggregated data store 132, e.g., as ingested customer data 138.

Referring back to FIG. 1A, a pre-processing engine 140 executed by the one or more processors of FI computing system 130 may access ingested customer data 138, and perform any of the exemplary data pre-processing operations described herein to selectively aggregate, filter, and process portions of the elements of ingested customer data 138, and to generate consolidated data records 142. In some instances, consolidated data records 142 may characterize corresponding ones of the customers, their financial and non-financial interactions with the financial institution and with other financial institutions, and existing behavioral profiles of corresponding ones of the customers during a temporal interval associated with the ingestion of customer data 104A, account data 104B, transaction data 104C, activity data 106, and/or existing behavioral profile data 108 by executed ingestion engine 136, e.g., via any of programmatic or RPA-based processes described herein.

By way of example, executed pre-processing engine 140 may access the data records of customer data 104A, account data 104B, transaction data 104C, activity data 106, and/or existing behavioral profile data 108 (e.g., as maintained within ingested customer data 138). As described herein, each of the accessed data records may include an identifier of corresponding customer of the financial institution, such as a customer name or an alphanumeric character string, and executed pre-processing engine 140 may perform operations that map each of the accessed data records to a customer identifier assigned to the corresponding customer by FI computing system 130. For instance, FI computing system 130 may assign an alphanumeric customer identifier to each customer, and executed pre-processing engine 140 may perform operations that parse the accessed data records, obtain each of the parsed data records that identifies the corresponding customer using a customer name, and replace that customer name with the corresponding alphanumeric customer identifier.

Executed pre-processing engine 140 may also perform operations that assign a temporal identifier to each of the accessed data records, and that augment each of the accessed data records to include the newly assigned temporal identifier. In some instances, the temporal identifier may associate each of the accessed data records with a corresponding temporal interval, which may be indicative of reflect a regularity or a frequency at which FI computing system 130 ingests the elements of customer data 104A, account data 104B, transaction data 104C, activity data 106, and/or existing behavioral profile data 108 corresponding ones of source systems 102. For example, executed ingestion engine 136 may receive data from corresponding ones of source systems 102 on a monthly basis (e.g., on the final day of the month), and in particular, may receive and store the elements of customer data 104A, account data 104B, transaction data 104C, activity data 106, and/or existing behavioral profile data 108 from corresponding ones of source systems 102 on Mar. 31, 2022. Executed pre-processing engine 140 may also generate a temporal identifier associated with the regular, monthly ingestion of customer data 104A, account data 104B, transaction data 104C, no activity data 106, and/or existing behavioral profile data 108 on Mar. 31, 2022 (e.g., "2022-03-31"), and may augment the accessed data records of customer data 104A, account data 104B, transaction data 104C, activity data 106, and/or existing behavioral profile data 108 to include the generated temporal identifier. The disclosed embodiments are, however, not limited to temporal identifiers reflective of a regular, monthly ingestion of data by FI computing system 130, and in other instances, executed pre-processing engine 140 may augment the accessed data records to include temporal identifiers reflective of any additional, or alternative, temporal interval during which FI computing system 130 ingests the elements of customer data 104A, account data 104B, transaction data 104C, activity data 106, and/or existing behavioral profile data 108.

In some instances, executed pre-processing engine 140 may perform further operations that, for a particular customer of the financial institution during the temporal interval (e.g., represented by a pair of the customer and temporal identifiers described herein), obtain one or more data records of customer data 104A, account data 104B, transaction data 104C, activity data 106, and/or existing behavioral profile data 108 that include the pair of customer and temporal identifiers (e.g., collectively, interaction data). Executed pre-processing engine 140 may perform operations that consolidate the one or more obtained data records and generate a corresponding one of consolidated data records 142 that includes the customer identifier and temporal identifier, and that is associated with, and characterizes, the particular customer of the financial institution across the temporal interval. By way of example, executed pre-processing engine 140 may consolidate the obtained data records, which include the pair of customer and temporal identifiers, through an invocation of an appropriate Java-based SQL "join" command (e.g., an appropriate "inner" or "outer" join command, etc.). Further, executed pre-processing engine 140 may perform any of the exemplary processes described herein to generate another one of consolidated data records 142 for each additional, or alternate, customer of the financial institution during the temporal interval (e.g., as represented by a corresponding customer identifier and the temporal interval).

Executed pre-processing engine 140 may perform operations that store each of consolidated data records 142 within the one or more tangible, non-transitory memories of FI computing system 130, such as within consolidated data store 144. Consolidated data store 144 may, for instance, correspond to a data lake, a data warehouse, or another centralized repository established and maintained, respectively, by the distributed components of FI computing system 130, e.g., through a Hadoop™ distributed file system (HDFS). In some instances, and as described herein, consolidated data records 142 may include a plurality of discrete data records, and each of these discrete data records may be associated with, and may maintain data characterizing, a corresponding one of the customers of the financial institution during the corresponding temporal interval (e.g., a month-long interval extending from Mar. 1, 2022, to Mar. 31, 2022). For example, and for a particular customer of the financial institution, discrete data record 142A of consolidated data records 142 may include a party identifier 146 of the particular customer (e.g., an alphanumeric character string "CUSTID"), a temporal identifier 148 of the corresponding temporal interval (e.g., a numerical string "2022-03-31"), and consolidated data elements 150 of customer, account, transaction, activity, and/or existing behavioral profile data that characterize the particular customer during the corresponding temporal interval (e.g., as consolidated from the elements of customer data 104A, account data 104B, transaction data 104C, activity data 106, and/or existing behavioral profile data 108 ingested by FI computing system 130 on Mar. 31, 2022).

Discrete data record 142A of consolidated data records 142 may also maintain, for the particular customer of the financial institution, one or more elements of aggregated data 152 that include aggregated elements of the account, transaction, or activity data that characterize a behavior of the particular customer during the temporal interval extending from Mar. 1, 2022, to Mar. 31, 2022. For example, executed pre-processing engine 140 may process the data records of account data 104B (e.g., as maintained within ingested customer data 138) to compute aggregate values of account parameters that include, but are not limited to, an average balance of one or more accounts held by the particular customer, or a total number of withdrawals of funds from, or deposits of funds into, one or more of the accounts held the particular customer, during the month-long interval. Additionally, in some examples, executed pre-processing engine 140 may process the data records of transaction data 104C (e.g., as maintained within ingested customer data 138) to compute aggregate values of transaction parameters that include, but are not limited to, an aggregate or time-averaged value of transactions initiated, cleared and settled during the month-long interval, or an aggregate or average daily value of those initiated, cleared, and settled transactions that involve a particular payment instrument, or a particular counterparty. Further, the aggregate values of transaction parameters may also include, among other things, an aggregate value or total number of transactions initiated, and deemed fraudulent, during the month-long interval, an average daily value or number of the fraudulent transactions, or an aggregate or average daily value or number of those fraudulent transactions that involve a particular payment instrument, or a particular counterparty Further, executed pre-processing engine 140 may process the data records of activity data 106 (e.g., as maintained within ingested customer data 138) to compute aggregate values of one or more interaction parameters that characterize interactions with the financial institution requested by the particular customer during the temporal interval extending from Mar. 1, 2022, to Mar. 31, 2022. Examples of the aggregate values of the interaction parameters may include, but are not limited to, a total number of attempted and/or successful logins to the mobile banking application of the financial institution or the web-based online banking platform of the financial institution during the temporal interval, a total number of attempts by the particular customer to change a customer name, address, or phone number during the temporal interval, or a total number of attempts by the particular customer to modify a login credential during the temporal interval.

The aggregate values of interaction parameters may also include, among other things, an aggregate value or total number of interactions initiated, and deemed fraudulent, during the month-long interval, an average daily value or number of the fraudulent requests, or an aggregate or average daily value or number of those fraudulent requests that particular access product (e.g., a mobile application, web-based online banking platform, or voice-based banking platform, etc.) or are associated with a particular interaction type (e.g., an identifier of an activity associated with the requested and authorized interaction, e.g., a balance request, a request to modify an authentication credential or contact information, etc.). The disclosed embodiments are, however, not limited to these exemplary aggregate values of account, transaction, or interaction parameters, and in other examples, executed pre-processing engine 140 may compute, and aggregated data 152 may include, any additional or alternate aggregated values of account, transaction, or interaction parameters the characterize the behavior of particular customer across the month-long interval extending from Mar. 1, 2022, to Mar. 31, 2022.

In some examples, illustrated in FIG. 1A, discrete data record 142A of consolidated data records 142 may also maintain existing behavioral profile data 154 characterizing and specifying an existing behavioral profile for the particular customer that is associated with, and valid during, the month-long interval extending from Mar. 1, 2022, to Mar. 31, 2022 (e.g., as extracted from existing behavioral profile data 108 by executed pre-processing engine 140). As described herein, the existing behavioral profile for the particular customer may characterize an expected transaction- or interaction-specific behavior of the particular customer (e.g., a "normal" or "baseline" transactional or spending behavior) during the month-long interval extending from Mar. 1, 2022, to Mar. 31, 2022.

Further, in some instances, consolidated data store 144 may maintain each of consolidated data records 142, which characterize corresponding ones of the customers, their interactions with the financial institution and with other financial institutions, and any associated default events during the temporal interval, in conjunction with additional consolidated data records 156. Executed pre-processing engine 140 may perform any of the exemplary processes described herein to generate each of the additional consolidated data records 156, including based on elements of profile, account, transaction, activity, and/or existing behavioral profile data ingested from source systems 102 during the corresponding prior temporal intervals.

Each of additional consolidated data records 156 may also include a plurality of discrete data records that are associated with and characterize a particular one of the customers of the financial institution during a corresponding one of the prior temporal intervals. For example, as illustrated in FIG. 1A, additional consolidated data records 156 may include one or more discrete data records, such as discrete data record 156A, associated with a prior temporal interval extending from Feb. 1, 2022, to Feb. 28, 2022. For the particular customer, discrete data record 156A may include party identifier 146 of the particular customer (e.g., an alphanumeric character string "CUSTID"), a temporal identifier 158 of the prior temporal interval (e.g., a numerical string "2022-02-28"), consolidated elements 160 of customer, account, transaction, and/or activity data that characterize the particular customer during the prior temporal interval extending from Feb. 1, 2022, to Feb. 28, 2022 (e.g., as consolidated from the data records ingested by FI computing system 130 on Feb. 28, 2022 using any of the exemplary processes described herein). Further, as illustrated in FIG. 1A, discrete data record 156A may also include one or more elements of aggregated data 162 that include aggregated elements of account, transaction, or activity data that characterize a behavior of the particular customer during the prior temporal interval extending from Feb. 1, 2022, to Feb. 28, 2022 (such as, but not limited to, those described herein), and behavioral profile data 164 characterizing and specifying an existing behavioral profile for the particular customer that is associated with, and valid during, the prior temporal interval extending from Feb. 1, 2022, to Feb. 28, 2022.

The disclosed embodiments are, however, not limited to the exemplary consolidated data records described herein, or to the exemplary temporal intervals described herein. In other examples, FI computing system 130 may generate, and the consolidated data store 144 may maintain any additional or alternate number of discrete sets of consolidated data records, having any additional or alternate composition, that would be appropriate to the elements of customer, account, transaction, activity, and/or exiting behavioral profile data ingested by FI computing system 130 at the predetermined intervals described herein. Further, in some examples, FI computing system 130 may ingest elements of customer, account, transaction, activity, and/or exiting profile data from source systems 102 at any additional, or alternate, fixed or variable temporal interval that would be appropriate to the ingested data or to the adaptive training of the machine learning or artificial intelligence processes described herein, including a continuous, real-time ingestion of the elements of customer, account, transaction, activity, and/or existing behavioral profile data.

In some examples, FI computing system 130 may perform operations that adaptively train a machine-learning or artificial-intelligence process to predict an expected, customer-specific value of a targeted set of transactional or interaction parameters during a temporal interval, and to predict a range of expected deviations from these customer-specific values of the transactional or interaction parameters during the temporal interval, using training datasets associated with a first prior temporal interval (e.g., a "training" interval), and using validation datasets associated with a second, and distinct, prior temporal interval (e.g., an out-of-time "validation" interval). As described herein, the expected, customer-specific values for the transaction or interaction parameters, and additionally, or alternatively, the expected deviations from these customer-specific values of the transaction or interaction parameters, may establish collectively a behavioral profile for corresponding ones of the customers that, when coupled to many existing, rule-based processes for prioritizing queues of potentially fraudulent transactions, or subjective, intuition- or experience-based processes categorizing a potentially fraudulent transaction as an instance of actual fraud, boost and accuracy and effectiveness characteristic of these existing, rule-based processes and subjective, intuition- or experience-based processes.

The training and validation datasets may include, but are not limited to, values of adaptively selected features obtained, extracted, or derived from the consolidated data records maintained within consolidated data store 144, e.g., from data elements maintained within the discrete data records of consolidated data records 142 or the additional consolidated data records 156. By way of example, the values of adaptively selected features of the training and validation datasets may be obtained, extracted, or derived from the consolidated elements of the customer, account, transaction, activity, and/or existing behavioral profile data maintained within the consolidated data records of consolidated data store 144. The adaptive selected feature values may also include one, or more, the aggregated values of the account, transaction, and/or interaction parameters that characterize the customers of the financial institution during respective ones of the training and validation intervals.

In some examples, the machine-learning or artificial-intelligence process may include an ensemble or decision-tree process, such as a gradient-boosted decision-tree process (e.g., the XGBoost process) implemented across the distributed computing components of FI computing system 130. The trained machine-learning or artificial-intelligence process may also include, but are not limited to, a clustering process, an unsupervised learning process (e.g., a k-means algorithm, a mixture model, a hierarchical clustering algorithm, etc.), a semi-supervised learning process, a supervised learning process, or a statistical process (e.g., a multinomial logistic regression model, etc.). Further, in some examples, the trained machine-learning or artificial-intelligence process may also include, among other things, a random decision forest, an artificial neural network, a deep neural network, or an association-rule process (e.g., an Apriori algorithm, an Eclat algorithm, or an FP-growth algorithm).

For example, the distributed computing components of FI computing system 130 (e.g., that include one or more GPUs or TPUs configured to operate as a discrete computing cluster) may perform any of the exemplary processes described herein to adaptively train the machine-learning or artificial-intelligence process (e.g., the gradient-boosted, decision-tree process) in parallel through an implementation of one or more parallelized, fault-tolerant distributed computing and analytical processes. Based on an outcome of these adaptive training processes, FI computing system 130 may generate model coefficients, parameters, thresholds, and other modelling data that collectively specify the trained machine learning or artificial intelligence process, and may store the generated model coefficients, parameters, thresholds, and modelling data within a portion of the one or more tangible, non-transitory memories, e.g., within consolidated data store 144.

Referring to FIG. 1B, a training engine 176 executed by the one or more processors of FI computing system 130 may access the consolidated data records maintained within consolidated data store 144, such as, but not limited to, the discrete data records of consolidated data records 142 or additional consolidated data records 156. As described herein, each of the consolidated data records, such as discrete data record 142A of consolidated data records 142 or discrete data record 156A of additional consolidated data records 156, may include a customer identifier of a corresponding one of the customers of the financial institution (e.g., party identifier 146 of FIG. 1A) and a temporal identifier that associates the consolidated data record with a corresponding temporal interval (e.g., temporal identifiers 148 and 158 of FIG. 1A). Each of the accessed consolidated data records may also include consolidated elements of customer, account, transaction, and interaction data (e.g., consolidated data elements 150 and 160 of FIGS. 1A and 1B), aggregated values of account, transaction, and/or interaction parameters (e.g., aggregated data elements 152 and 162 of FIGS. 1A and 1B), and data specifying an existing behavioral profile that characterize the corresponding one of the customers during the corresponding temporal interval (e.g., elements of existing behavioral profile data 154 and 164 of FIGS. 1A and 1B).

Figure 1C:
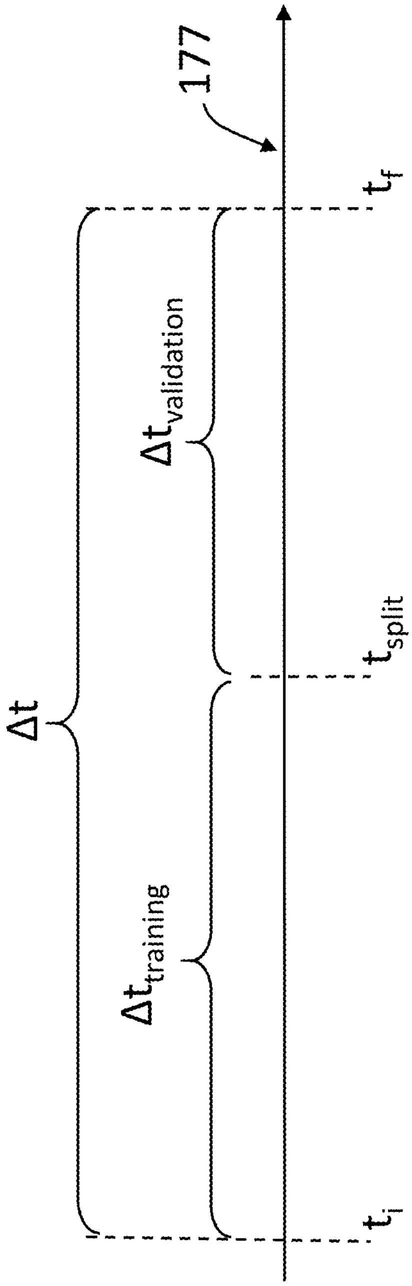
FIG. 1C is a diagram of an exemplary timeline for adaptively training a machine-learning or artificial intelligence process, in accordance with some exemplary embodiments.

In some instances, executed training engine 176 may parse the accessed consolidated data records, and based on corresponding ones of the temporal identifiers, determine that the consolidated data records characterize the corresponding customers across a range of prior temporal intervals. By way of example, executed training engine 176 may also perform operations that decompose the determined range of prior temporal intervals into a corresponding first subset of the prior temporal intervals (e.g., the "training" interval described herein) and into a corresponding second, subsequent, and disjoint subset of the prior temporal intervals (e.g., the "validation" interval described herein). For instance, as illustrated in FIG. 1C, the range of prior temporal intervals (e.g., shown generally as $\Delta t$ along timeline 177 of FIG. 1C) may be bounded by, and established by, temporal boundaries $t_i$ and $t_f$. Further, the decomposed first subset of the prior temporal intervals (e.g., shown generally as training interval $\Delta t_{training}$ along timeline 177 of FIG. 1C) may be bounded by temporal boundary $t_i$ and a corresponding splitting point $t_{split}$ along timeline 177, and the decomposed second subset of the prior temporal intervals (e.g., shown generally as validation interval $\Delta t_{validation}$ along timeline 177 of FIG. 1C) may be bounded by splitting point $t_{split}$ and temporal boundary $t_f$.

Referring back to FIG. 1B, executed training engine 176 may generate, and within consolidated data store 144, elements of splitting data 178 that identify and characterize the determined temporal boundaries of the consolidated data records maintained within consolidated data store 144 (e.g., temporal boundaries $t_i$ and $t_f$) and the range of prior temporal intervals established by the determined temporal boundaries Further, the elements of splitting data 178 may also identify and characterize the splitting point (e.g., the splitting point $t_{split}$ described herein), the first subset of the prior temporal intervals (e.g., the training interval $\Delta t_{training}$ and corresponding boundaries described herein), and the second, and subsequent subset of the prior temporal intervals (e.g., the validation interval $\Delta t_{validation}$ and corresponding boundaries described herein).

In some examples, a training input module 180 of executed training engine 176 may perform operations that access the consolidated data records maintained within consolidated data store 144. Based on portions of splitting data 178, executed training input module 180 may perform operations that parse the consolidated data records and determine: (i) a first subset 182A of these consolidated data records are associated with the training interval $\Delta t_{training}$ and may be appropriate to training adaptively the gradient-boosted decision model during the training interval; and a (ii) second subset 182B of these consolidated data records are associated with the validation interval $\Delta t_{validation}$ and may be appropriate to validating the adaptively trained gradient-boosted decision model during the validation interval.

Referring back to FIG. 1B, executed training input module 180 may perform operations that access the consolidated data records maintained within consolidated data store 144, and parse each of the consolidated data records to obtain a corresponding customer identifier (e.g., which associates with the consolidated data record with a corresponding one of the customers of the financial institution) and a corresponding temporal identifier (e.g., which associated the consolidated data record with a corresponding temporal interval). For example, and based on the obtained customer and temporal identifiers, executed training input module 180 may generate sets of segmented data records associated with corresponding ones of the customer identifiers (e.g., customer-specific sets of segmented data records), and within each set of segmented data records, executed training input module 180 may order the consolidated data records sequentially in accordance with the obtained temporal interval.

Executed training input module 180 may also perform operations that partition the customer-specific sets of sequentially ordered data records into subsets suitable for training adaptively the gradient-boosted, decision-tree process (e.g., which may be maintained in first subset 182A of consolidated data records within consolidated data store 144) and for validating the adaptively trained, gradient-boosted, decision-tree process (e.g., which may be maintained in second subset 182B of consolidated data records within consolidated data store 144). By way of example, executed training input module 180 may access splitting data 178, and establish the temporal boundaries for the training interval $\Delta t_{training}$ (e.g., temporal boundary $t_i$ and splitting point $t_{split}$) and the validation interval $\Delta t_{training}$ (e.g., splitting point $t_{split}$ and temporal boundary $t_f$). Further, executed training input module 180 may also parse each of the sequentially ordered data records of the customer-specific sets, access the corresponding temporal identifier, and determine the temporal interval associated with the each of sequentially ordered data records.

If, for example, executed training input module 180 were to determine that the temporal interval associated with a corresponding one of the sequentially ordered data records is disposed within the temporal boundaries for the training interval $\Delta t_{training}$, executed training input module 180 may determine that the corresponding data record may be suitable for training, and may perform operations that include the corresponding data record within a portion of the first subset 182A (e.g., that store the corresponding data record within a portion of consolidated data store 144 associated with first subset 182A). Alternatively, if executed training input module 180 were to determine that the temporal interval associated with a corresponding one of the sequentially ordered data records is disposed within the temporal boundaries for the validation interval $\Delta t_{validation}$, executed training input module 180 may determine that the corresponding data record may be suitable for validation, and may perform operations that include the corresponding data record within a portion of the second subset 182B (e.g., that store the corresponding data record within a portion of consolidated data store 144 associated with second subset 182B). Executed training input module 180 may perform any of the exemplary processes described herein to determine the suitability of each additional, or alternate, one of the sequentially ordered data records of the customer-specific sets for adaptive training, or alternatively, validation, of the machine-learning or artificial intelligence process (e.g., by filtering the consolidated data records of first subset 182A and second subset 182B in accordance with one or more filtration criteria).

Referring back to FIG. 1B, executed training input module 180 may perform operations that generate a plurality of training datasets 184 based on elements of data obtained, extracted, or derived from all or a selected portion of first subset 182A of the consolidated data records. In some instances, the plurality of training datasets 184 may enable executed training engine 176 to train adaptively the gradient-boosted decision-tree process to predict an expected, customer-specific values of a targeted set of transactional or interaction parameters during a predetermined, future temporal interval, and to predict a range of expected deviations from these customer-specific values of the transactional or interaction parameters during the future temporal interval. By way of example, By way of example, each of the plurality of training datasets 184 may be associated with a corresponding one of the customers of the financial institution and a corresponding temporal interval, and may include, among other things a customer identifier associated with that corresponding customer and a temporal identifier representative of the corresponding temporal interval, as described herein. Each of the plurality of training datasets 184 may also include elements of data (e.g., feature values) that characterize the corresponding one of the customers and the corresponding customer's interactions with the financial institution or with other financial institution during the one or more prior temporal intervals. In some instances, executed training input module 180 may perform operations that identify, and obtain or extract, one or more of the features values from the consolidated data records maintained within first subset 182A and associated with the corresponding one of the customers. The obtained or extracted feature values may, for example, include elements of one or more of the customer, account, transaction, activity, and/or existing behavioral profile data described herein, and additionally or alternatively, one or more of the aggregated values of account, transaction, or interaction parameters described herein (e.g., which may populate the consolidated data records maintained within first subset 182A). The disclosed embodiments are, however, not limited to these examples of obtained or extracted feature values, and in other instances, training datasets 184 may include any additional or alternate element of data extracted or obtained from the consolidated data records of first subset 182A, associated with corresponding ones of the customers, and associated with the one or more prior temporal intervals.

Further, in some instances, executed training input module 180 may perform operations that compute, determine, or derive one or more of the features values based on elements of data extracted or obtained from the consolidated data records maintained within first subset 182A. Examples of these computed, determined, or derived feature values may include, but are not limited to, time-average values of transactions associated with one or more financial products or payment instruments held by corresponding ones of the customer, time-average balances associated with these financial products, or sums of balances associated with various financial products or payment instruments held by corresponding ones of the customers. In other examples, the computed, determined, or derived feature values may include, but are not limited to, time-averaged, customer-specific numbers of attempted and/or successful logins to mobile applications or web-based online banking platforms of the financial institution, time-averaged, customer-specific numbers of attempts to change a customer name, address, or phone number using corresponding ones of the access products, or time-averaged, customer-specific numbers of attempts to modify an authentication credential using corresponding ones of the access products. These disclosed embodiments are, however, not limited to these examples of computed, determined, or derived feature values, and in other instances, training datasets 184 may include any additional or alternate featured computed, determine, or derived from data extracted or obtained from the consolidated data records of first subset 182A, associated with corresponding one of the customers, and associated with the one or more prior temporal intervals.

Further, each of training datasets 184 may also be associated with one or more elements of ground-truth data 185, such as, but not limited to, data characterizing all, or a selected portion, of the existing behavioral profile for the corresponding customer (e.g., existing behavioral profile data 154 of discrete data record 142A and existing behavioral profile data 164 of discrete data record 156A, etc.). By way of example, and as described herein, executed training engine 176 may perform operations that adaptively train a machine-learning or artificial-intelligence process to predict an expected, customer-specific values of a targeted set of transactional or interaction parameters during a predetermined, future temporal interval, and to predict a range of expected deviations from these customer-specific values of the transactional or interaction parameters during the temporal interval, based on, among other things, corresponding ones of training datasets 184.

In some instances, executed training input module 180 may access one or more elements of targeting data 181, which identify and characterize each of the targeted set of transactional or interaction parameters. Executed training input module 180 may access the data characterizing the existing behavioral profile for the corresponding customer (e.g., existing behavioral profile data 154 of discrete data record 142A, existing behavioral profile data 164 of discrete data record 156A, etc.), and based on the elements of targeting data 181, may perform operations that package all, or a selected portion, of the accessed data into the corresponding element of ground-truth data 185. Further, in some instances, executed training input module 180 may also access portions of the consolidated data records of first subset 182A associated with the corresponding customer and the corresponding prior temporal interval, and may obtain data characterizing one or more initiated transactions, or requested interactions, that involve the corresponding customer and that represent actual instances of fraudulent activity (e.g., as determined by FI computing system 130 or by a representative of the financial institution using any of the exemplary processes described herein). Executed training input module 180 may package the data characterizing the one or more initiated transactions or requested interactions that involve the corresponding customer and that represent instances of actual fraud into the corresponding element of ground-truth data.

Referring back to FIG. 1B, executed training input module 180 may provide training datasets 184 and the corresponding elements of ground-truth data 185, and in some instances, the elements of targeting data 181, as inputs to an adaptive training and validation module 186 of executed training engine 176. Upon execution by the one or more processors of FI computing system 130, adaptive training and validation module 186 may perform operations that train adaptively the machine-learning or artificial-intelligence process in accordance with the elements of targeting data 181 and against the elements of training data included within each of training datasets 184 and corresponding elements of ground-truth data 185. In some examples, the distributed components of FI computing system 130 may execute adaptive training and validation module 186, and may perform any of the exemplary processes described herein in parallel to train adaptively the machine-learning or artificial-intelligence process in accordance with the elements of targeting data 181 and against the elements of training data included within each of training datasets 184 and corresponding elements of ground-truth data 185. The parallel implementation of adaptive training and validation module 186 by the distributed components of FI computing system 130 may, in some instances, be based on an implementation, across the distributed components, of one or more of the parallelized, fault-tolerant distributed computing and analytical protocols described herein (e.g., the Apache Spark™ distributed, cluster-computing framework, etc.).

By way of example, the machine-learning or artificial-intelligence process may include an ensemble or decision-tree process, such as a gradient-boosted decision-tree process (e.g., an XGBoost process), and executed adaptive training and validation module 186 may perform operations establish a plurality of nodes and a plurality of decision trees for the gradient-boosted, decision-tree process, which may ingest and process the elements of training data (e.g., the customer identifiers, the temporal identifiers, the feature values, etc.) maintained within each of the plurality of training datasets 184. Based on the execution of adaptive training and validation module 186, and on the ingestion of each of training datasets 184 by the established nodes of the gradient-boosted, decision-tree process, FI computing system 130 may perform operations that adaptively train the gradient-boosted, decision-tree process in accordance with the elements of targeting data 181 and against the elements of training data included within each of training datasets 184 and corresponding elements of ground-truth data 185. In some examples, during the adaptive training of the gradient-boosted, decision-tree process, executed adaptive training and validation module 186 may perform operations that characterize a relative of importance of discrete features within one or more of training datasets 184 through a generation of corresponding Shapley feature values or through a generation of a computed area under curve for corresponding receiver operating characteristic (ROC) curves.

Through the performance of these adaptive training processes, executed adaptive training and validation module 186 may perform operations that compute one or more candidate model parameters that characterize the adaptively trained machine-learning or artificial-intelligence process, and package the candidate model parameters into corresponding portions of candidate process data 188. By way of example, and for the adaptively trained, gradient-boosted, decision-tree process described herein, the candidate process parameters included within candidate process data 188 may include, but are not limited to, a learning rate associated with the adaptively trained, gradient-boosted, decision-tree process, a number of discrete decision trees included within the adaptively trained, gradient-boosted, decision-tree process, a tree depth characterizing a depth of each of the discrete decision trees, a minimum number of observations in terminal nodes of the decision trees, and/or values of one or more hyperparameters that reduce potential model overfitting. Further, and based on the performance of these adaptive training processes, executed adaptive training and validation module 186 may also generate candidate input data 190, which specifies a candidate composition of an input dataset for the adaptively trained machine-learning or artificial-intelligence process.

As illustrated in FIG. 1B, executed adaptive training and validation module 186 may provide candidate process data 188 and candidate input data 190 as inputs to executed training input module 180 of training engine 176, which may perform any of the exemplary processes described herein to generate a plurality of validation datasets 192 having compositions consistent with candidate input data 190. By way of example, executed training input module 180 may parse candidate input data 190 to obtain the candidate composition of the input dataset, which not only identifies the candidate elements of customer-specific data included within each validation dataset (e.g., the candidate feature values described herein), but also a candidate sequence or position of these elements of customer-specific data within the validation dataset. Examples of these candidate feature values include, but are not limited to, one or more of the feature values extracted, obtained, computed, determined, or derived by executed training input module 180 and packaged into corresponding portions of training datasets 184, as described herein.

Further, in some examples, each of the plurality of validation datasets 192 may be associated with a corresponding one of the customers of the financial institution, and with a corresponding temporal interval within the validation interval $\Delta_{validation}$, and executed training input module 180 may access the consolidated data records maintained within second subset 182B of consolidated data store 144, and may perform operations that extract, from an initial one of the consolidated data records, a customer identifier (which identifies a corresponding one of the customers of the financial institution associated with the initial one of the consolidated data records) and a temporal identifier (which identifies a temporal interval associated with the initial one of the consolidated data records). Executed training input module 180 may package the extracted customer identifier and temporal identifier into portions of a corresponding one of validation datasets 192, e.g., in accordance with candidate input data 190.

Executed training input module 180 may perform operations that access one or more additional ones of the consolidated data records that are associated with the corresponding one of the customers (e.g., that include the customer identifier) and as associated with the one or more prior temporal intervals (e.g., based on corresponding temporal identifiers). Based on portions of candidate input data 190, executed training input module 180 may identify, and obtain or extract one or more of the feature values of the validation datasets from within the additional ones of the consolidated data records within second subset 182B. Further, in some examples, and based on portions of candidate input data 190, executed training input module 180 may perform operations that compute, determine, or derive one or more of the features values based on elements of data extracted or obtained from further ones of the consolidated data records within second subset 182B. Executed training input module 180 may package each of the obtained, extracted, computed, determined, or derived feature values into corresponding positions within the initial one of validation datasets 192, e.g., in accordance with the candidate sequence or position specified within candidate input data 190.

The initial one of validation datasets 192 may also be associated with one or more elements of ground-truth data 193, such as, but not limited to, data characterizing all, or a selected portion, of the existing behavioral profile for the corresponding customer during the corresponding temporal interval (e.g., existing behavioral profile data 154 of discrete data record 142A and existing behavioral profile data 164 of discrete data record 156A, etc.) and data characterizing one or more initiated transactions or requested interactions that involve the corresponding customer and that represent actual instances of fraudulent activity during the corresponding temporal interval. In some instances, executed training input module 180 may perform any of the exemplary processes described herein to access one or more elements of targeting data 181, to access the data characterizing the existing behavioral profile for the corresponding customer (e.g., existing behavioral profile data 154 of discrete data record 142A, existing behavioral profile data 164 of discrete data record 156A, etc.), and to package all, of the selected portion, of the accessed data into the corresponding elements of ground-truth data 193 in accordance with the elements of targeting data 181. Further, in some instances, executed training input module 180 may also perform any of the exemplary processes described herein to package, into the corresponding elements of ground-truth data 193, data characterizing one or more initiated transactions, or requested interactions, that involve the corresponding customer and that represent actual instances of fraudulent activity during the corresponding prior temporal interval.

In some instances, executed training input module 180 may perform any of the exemplary processes described herein to generate additional, or alternate, ones of validation datasets 192 and additional, or alternate, elements of ground-truth data 193, based on the elements of data maintained within the consolidated data records of second subset 182B. For example, each of the additional, or alternate, ones of validation datasets 192 may be associated with a corresponding, and distinct, pair of customer and temporal identifiers, and as such, corresponding customers of the financial institution and corresponding temporal intervals within validation interval $\Delta t_{validation}$. Further, executed training input module 180 may perform any of the exemplary processes described herein to generate an additional, or alternate, ones of validation datasets 192, and corresponding elements of ground-truth data 193, associated with each unique pair of customer and temporal identifiers maintained within the consolidated data records of second subset 182B, and in other instances a number of discrete validation datasets within validation datasets 192 (and corresponding elements of ground-truth data 193) may be predetermined or specified within candidate input data 190.

Referring back to FIG. 1B, executed training input module 180 may provide the plurality of validation datasets 192 and the corresponding elements of ground-truth data 193 as inputs to executed adaptive training and validation module 186. In some examples, executed adaptive training and validation module 186 may perform operations that apply the adaptively trained machine-learning or artificial-intelligence process to respective ones of validation datasets 192 (e.g., based on the candidate model parameters within candidate process data 188, as described herein), and that generate elements of output data based on the application of the adaptively trained, machine-learning or artificial-intelligence process to corresponding ones of validation datasets 192.

As described herein, each of the each of elements of output data may be generated through the application of the adaptively trained machine-learning or artificial-intelligence process a corresponding one of validation datasets 192. The elements of output data may, for a corresponding customer of the financial institution, include a customer identifier (e.g., identifying the corresponding customer of the financial institution), a temporal identifier (e.g., identifying the predetermined, future temporal interval), and elements of behavioral profile data that include customer-specific values of a targeted set of transactional or interaction parameters during a temporal interval (e.g., as specified within the elements of targeting data 181) and a range of expected deviations from each the customer-specific values of the transactional or interaction parameters during the temporal interval. By way of example, the customer-specific values for the transaction or interaction parameters, and additionally, or alternatively, the ranges of expected deviations from these customer-specific values of the transaction or interaction parameters may establish collectively a behavioral profile for the corresponding customer that remains valid throughout the predetermined, future temporal interval.

Executed adaptive training and validation module 186 may perform operations that compute a value of one or more metrics that characterize a predictive capability, and an accuracy, of the adaptively trained machine-learning or artificial-intelligence process based on the generated elements of output data, corresponding ones of validation datasets 192, and corresponding elements of ground-truth data 193. The computed metrics may include, but are not limited to, one or more recall-based values for the adaptively trained machine-learning or artificial-intelligence process (e.g., “recall@5,” “recall@10,” “recall@20,” etc.), and additionally, or alternatively, one or more precision-based values for the adaptively trained machine-learning or artificial-intelligence process. Further, in some examples, the computed metrics may include a computed value of an area under curve (AUC) for a precision-recall (PR) curve associated with the adaptively trained machine-learning or artificial-intelligence process, and additional, or alternatively, computed value of an AUC for a receiver operating characteristic (ROC) curve associated with the adaptively trained machine-learning or artificial-intelligence process. The disclosed embodiments are, however, not limited to these exemplary computed metric values, and in other instances, executed adaptive training and validation module 186 may compute a value of any additional, or alternate, metric appropriate to validation datasets 192, the elements of ground-truth data, or the adaptively trained machine-learning or artificial-intelligence process (e.g., the adaptively trained, gradient-boosted, decision-tree process described herein).

In some examples, executed adaptive training and validation module 186 may also perform operations that determine whether all, or a selected portion of, the computed metric values satisfy one or more threshold conditions for a deployment of the adaptively trained machine-learning or artificial-intelligence and a real-time application to elements of customer, account, transaction, activity, or existing behavioral profile data, as described herein. For instance, the one or more threshold conditions may specify one or more predetermined threshold values for the adaptively trained machine-learning or artificial-intelligence, such as, but not limited to, a predetermined threshold value for the computed recall-based values, a predetermined threshold value for the computed precision-based values, and/or a predetermined threshold value for the computed AUC values. In some examples, executed adaptive training and validation module 186 that establish whether one, or more, of the computed recall-based values, the computed precision-based values, or the computed AUC values exceed, or fall below, a corresponding one of the predetermined threshold values and as such, whether the adaptively trained machine-learning or artificial-intelligence satisfies the one or more threshold requirements for deployment.

If, for example, executed adaptive training and validation module 186 were to establish that one, or more, of the computed metric values fail to satisfy at least one of the threshold requirements, FI computing system 130 may establish that the adaptively trained machine-learning or artificial-intelligence is insufficiently accurate for deployment and a real-time application to the elements of customer, account, transaction, activity, and/or existing behavioral profile data described herein. Executed adaptive training and validation module 186 may perform operations (not illustrated in FIG. 1C) that transmit data indicative of the established inaccuracy to executed training input module 180, which may perform any of the exemplary processes described herein to generate one or more additional training datasets, and corresponding elements of ground-truth data, and to provision those additional encrypted training datasets to executed adaptive training and validation module 186. In some instances, executed adaptive training and validation module 186 may receive the additional training datasets, and may perform any of the exemplary processes described herein to train further the machine-learning or artificial-intelligence against the elements of training data included within each of the additional training datasets.

Alternatively, if executed adaptive training and validation module 186 were to establish that each computed metric value satisfies threshold requirements, FI computing system 130 may deem the machine-learning or artificial-intelligence adaptively trained, and ready for deployment and real-time application to the elements of customer, account, transaction, activity, and/or existing behavioral profile data described herein. In some instances, executed adaptive training and validation module 186 may generate process parameter data 194 that includes the model parameters of the adaptively trained machine-learning or artificial-intelligence, such as, but not limited to, each of the candidate model parameters specified within candidate process data 188. Further, executed adaptive training and validation module 186 may also generate process input data 196, which characterizes a composition of an input dataset for the adaptively trained machine-learning or artificial-intelligence and identifies each of the discrete data elements within the input data set, along with a sequence or position of these elements within the input data set (e.g., as specified within candidate input data 190). As illustrated in FIG. 1C, executed adaptive training and validation module 186 may perform operations that store process parameter data 194 and process input data 196 within the one or more tangible, non-transitory memories of FI computing system 130, such as consolidated data store 144.

B. Exemplary Processes for Dynamically Profiling Customer Behavior based on Trained Machine Learning or Artificial Intelligence Processes In some examples, one or more computing systems associated with or operated by a financial institution, such as one or more of the distributed components of FI computing system 130, may perform operations that train adaptively a machine-learning or artificial-intelligence process to predict, for a customer of the financial institution, an expected, customer-specific value of one or more targeted transaction or interaction parameters that characterize a behavior of the customer during a temporal interval, and additionally, or alternatively, a range of expected deviations from each of these customer-specific values during the temporal interval, using training datasets associated with a first prior temporal interval (e.g., a "training" interval), and using validation datasets associated with a second, and distinct, prior temporal interval (e.g., an out-of-time "validation" interval). As described herein, the training and validation datasets may include, but are not limited to, values of dynamically selected features obtained, extracted, or derived from the maintained elements of customer-specific data that identify and characterize the each these customers, interactions between these customers and the financial institution, and an engagement of these customers with not only the financial products or services provisioned by the financial institution, but also one or more access products that facilitate customer interaction with the financial institution via corresponding digital channels (e.g., from elements of customer data 104A, account data 104B, transaction data 104C, activity data 106, and/or existing behavioral profile data 108 maintained within the consolidated data records of consolidated data store 144).

As described herein, the expected values of the transactional or interaction parameters, and additionally, or alternatively, the ranges of expected deviations from these values, may establish collectively a behavioral profile that characterizes an expected transaction- or interaction-specific behavior of the customer during the temporal interval and establishes a "normal" or "baseline" behavior of that customer during the future temporal interval. Further, the expected deviations specified within the behavioral profile for the customer may establish, individually or collectively, an expected variation from the expected behavior of the customer that would be consistent with that expected behavior, and as such, would not represent an instance of anomalous behavior inconsistent with the expected values of the transactional or interaction parameters. Further, and when implemented in conjunction with existing, rule-based processes for prioritizing queues of potentially fraudulent transactions or interactions for analyst review, or with existing, subjective, experience-driven processes for categorizing a potentially fraudulent transaction or interaction as an instance of actual fraud, certain of the exemplary processes described herein, which generate and dynamically update behavioral profiles for customers of the financial institution, may enhance or boost an accuracy and effectiveness of the rules-based and subjective, experience-driven processes, and may reduce occurrences of actual fraud involving the financial products and access products provisioned to the customers of the financial institution.

Figure 2A:
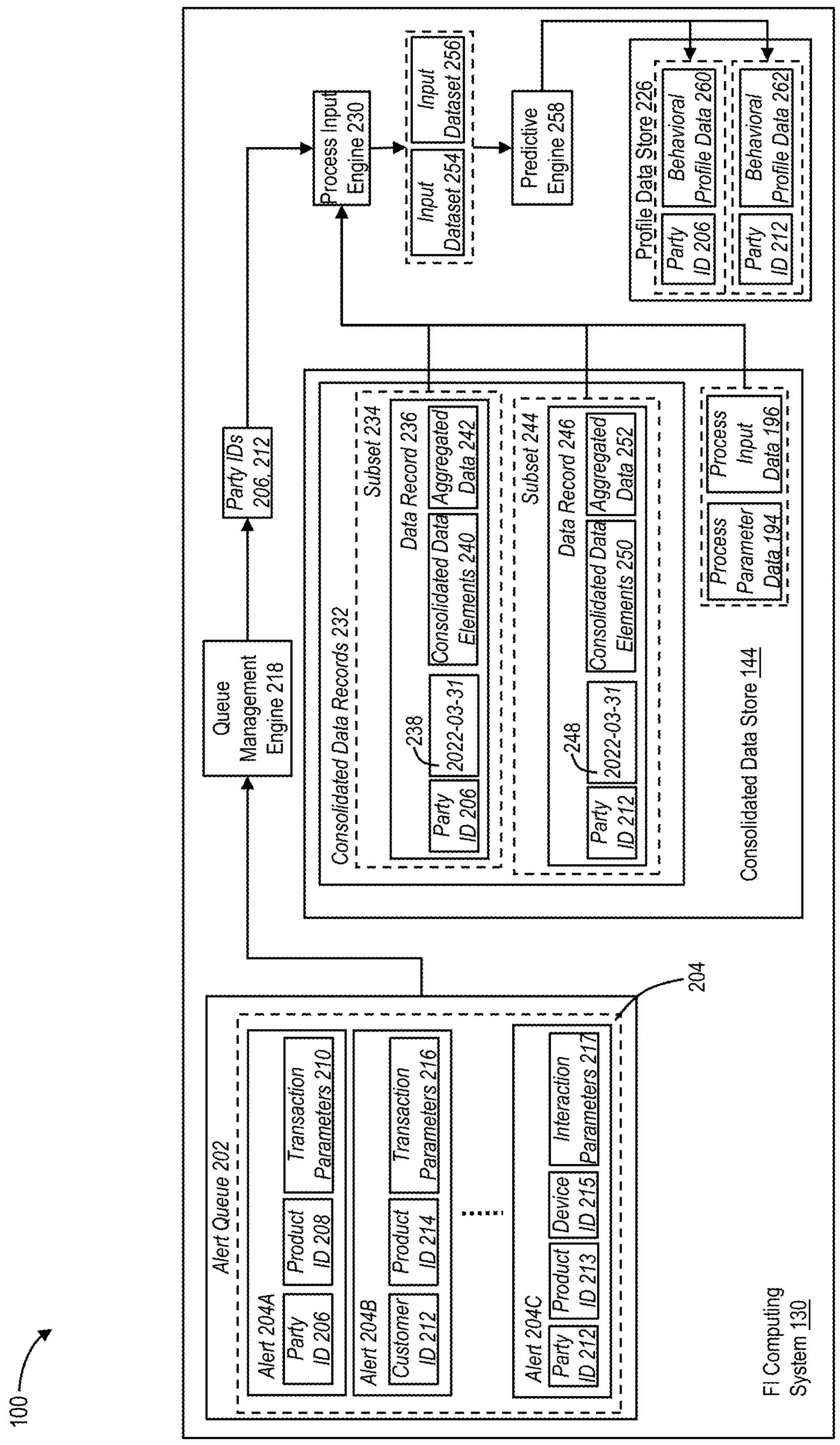
FIGS. 2A and 2B are block diagrams illustrating additional portions of the exemplary computing environment, in accordance with some exemplary embodiments.

Referring to FIG. 2A, FI computing system may maintain, within the one or more tangible, non-transitory memories, an alert queue 202 of discrete alerts 204 that identify and characterize a corresponding one or more potentially fraudulent transactions involving customers of the financial institution and financial products (e.g., payment instruments, deposit accounts, etc.) issued by the financial institution, and additionally or alternatively, one or more potentially fraudulent interactions requested by customers of the financial institution and involving access products provisioned by the financial institution (e.g., mobile applications, web-based online banking platforms, or voice-based banking platforms, etc.). By way of example, alerts 204 may include, among other things, discrete alerts 204A and 204B, which may be associated with corresponding initiated transactions that represent instances of potential fraudulent activity, and a discrete alert 204C, which may be associated with a requested interaction that represents an instance of potential fraudulent activity.

By way of example, alerts 204A and 204B may be associated with transactions initiated between customers of the financial institution (e.g., a first customer and second customer, respectively) and corresponding counterparties, and each of the initiated purchase transactions may be funded using a payment instrument issued by the financial institution and held by corresponding ones of the first and second customers (e.g., a deposit account, a credit-card account, etc.). As illustrated in FIG. 2A, alert 204A may include, among other things, a party identifier 206 associated with the first customer (e.g., an alphanumeric character string, such as an authentication credential, etc.), a product identifier 208 of the payment instrument held by the first customer (e.g., a portion of a tokenized account number, etc.), and one or more values 210 of transaction parameters that characterize the corresponding one of the initiated transactions. Further, alert 204B may include, among other things, a party identifier 212 associated with the second customer (e.g., an alphanumeric character string, such as an authentication credential, etc.), a product identifier 214 of the payment instrument held by the second customer (e.g., a portion of a tokenized account number, etc.), and one or more values 216 of transaction parameters that characterize the corresponding one of the initiated transactions. Examples of the transaction parameters include, but are not limited to, a transaction time, a transaction amount, an identifier of the corresponding counterparty (e.g., a merchant or retailer, etc.), geographic data characterizing the initiation of the corresponding transaction (e.g., a geographic location of the corresponding counterparty, a geographic location of a computing device operable by the first or second customers, etc.), and an identifier of a product or service (e.g., a product name, a UPC, etc.).

Further, alert 204C may be associated with an interaction with the financial institution requested by the second customer via one or more digital or voice-based channels. For example, the requested interaction may correspond to a request, by the second customer, to modify a corresponding authentication credential, such as an alphanumeric password, and the request may be generated by a mobile banking application executed by a computing device operable by the second customer, and alert 204C may include, among other things, party identifier 212, a product identifier 213 of the access product associated with the requested interaction (e.g., the mobile banking application), an identifier of the digital channel associated with the requested interaction, such as a device identifier 215 (e.g., an Internet Protocol (IP) address of the computing device of the second customer), and one or more values 217 of interaction parameters that characterize the potentially fraudulent interaction. Examples of the interaction parameters include, but are not limited to, an interaction time, an interaction type associated with the requested interaction (e.g., the modification to the authentication credential), and geographic data characterizing the requested interaction (e.g., a geographic location of the computing device of the second customer, etc.).

In some instances, to determine whether the initiated transactions, and additionally, or alternatively the requested interaction, represent instances of potential fraud, FI computing system 130 may perform any of the exemplary processes described herein to apply one or more predetermined, fraud-detection rules to elements of received transaction data characterizing each of the initiated transaction, and to elements of received request data associated with the requested interaction. Based on the application of the one or more predetermined, fraud-detection rules to the elements of received transaction data and received request data, FI computing system 130 may perform operations, described herein, to establish that each of the initiated transactions and the requested interaction represent instances of potentially fraudulent activity, and to generate respective ones of discrete alerts 204A, 204B, and 204C, which FI computing system 130 may store within portions of alert queue 202. Although not illustrated in FIG. 2A, FI computing system 130 may also perform any of the exemplary, rule-based processes described herein to prioritize, or rank, one or more of alerts 204, including discrete alerts 204A, 204B, and 204C, based on an application of one or more predetermined prioritization rules to portions of the one or more of alerts 204, e.g., to prioritize certain of alerts 204 associated with initiated transactions or requested interactions that represent likely instance of actual fraudulent activity.

Further, and as described herein, FI computing system 130 may also perform operations (not illustrated in FIG. 2A) that transmit portions of the prioritized elements of alerts 204, including discrete alerts 204A, 204B, and 204C, across communications network 120 to one or more computing devices or systems operable by representatives of the financial institution. FI computing system 130 may, for example, provision the portions of the prioritized elements of alerts 204 to the computing devices or systems of the representatives accordance with a predetermined schedule (e.g., on an hourly basis, a daily basis, etc.), or in real-time in response to a detected occurrence of a triggering event, such as, but not limited to, a detected addition of a further one of alerts 204 into alert queue 202 or a determination that a number of alerts 204 exceeds a threshold, etc. In some instances, each of computing systems or devices of the representatives may execute one or more application programs, such as a web browser, that presents a graphical representation of a corresponding portions of prioritized alerts 204 within one or more display screens of a digital interface, such as a browser window, and a corresponding representative may view each of the presented alerts and determine, based on personal experience or intuition, or based on one or more of the predetermined fraud detection rules (e.g., based on transaction amount, etc.), whether the corresponding potentially fraudulent transaction or potentially fraudulent interaction represents an actual instance of fraudulent activity.

As described herein, these rules-based processes for prioritizing elements of alert data associated with potentially fraudulent transactions or interactions within alert queue 202, and these subjective, experience-based processes for identifying actual instances of fraudulent activity associated with these potentially fraudulent transactions or interactions, may be incapable of accounting for time-varying changes in an expected transactional or spending behavior of the customers of the financial institution across multiple temporal intervals, much less for any time-varying changes in a behavior of these customers during interactions with the financial institution throughout these temporal intervals (e.g., attempts to access digital portals of the financial institution, attempts to modify customers names, addresses, or phone numbers, attempts to modify authentication credentials, etc.). Further, many of the rule-based processes for prioritizing the elements of alert data, and many of the subjective processes for detecting actual instances of fraudulent activity, may also be incapable of assessing whether a potentially fraudulent transaction involving a customer, or a potentially fraudulent non-financial interaction between the customer and the financial institution, represents an expected, and as such, acceptable, deviation from an expected behavior of that customer.

In other examples, and prior to provisioning the prioritized alerts to the computing devices or systems of the representatives, FI computing system 130 may perform any of the exemplary processes described herein to re-prioritize one or more of the discrete alerts maintained within alert queue 202, which identify and characterize initiated transactions or requested interactions that represent instances of potential fraudulent activity, based on customer-specific elements of behavioral profile data that characterize, for corresponding customers of the financial institution, expected, customer-specific values of targeted transactional or interaction parameters, and ranges of expected deviations from the customer-specific values of the targeted transactional or interaction parameters, during a temporal interval. As described herein, the expected, customer-specific values of the targeted set of transactional or interaction parameters, and the ranges of expected deviations from these customer-specific values, may establish collectively a behavioral profile that characterizes a "normal" or "baseline" behavior of corresponding ones of the customers during the temporal interval, and the expected, customer-specific values of the targeted set of transaction or interaction parameters, and the ranges of expected deviations from the values of the transactional or interaction parameters may enable FI computing system 130 to classify transactions initiated by the corresponding ones of the customers, or interactions requested by the corresponding ones of the customers, as consistent with, or inconsistent with, the normal or baseline behavior of those customers.

As described herein, a determined inconsistency between an initiated transaction or a requested interaction associated with a particular customer and the normal or baseline behavior of that customer may indicate that the initiated transaction, or the requested interaction, represents a likely instance of actual fraudulent activity, and in some instances, FI computing system 130 may perform any of the exemplary processes described herein to reprioritize all, or a selected subset, of the discrete alerts maintain within alert queue 202 based on a determination that corresponding ones of the initiated transactions, or the requested interactions, represent like instances of actual fraudulent activity. Certain of the exemplary processes described herein, when implemented by FI computing system 130 in addition to the existing, rule-based processes for prioritizing queues of potentially fraudulent transactions, or the subjective, intuition- or experience-based processes for categorizing a potentially fraudulent transaction or interactions, may enhance or boost an accuracy and effectiveness of the rules-based and subject, experience-driven processes, and may reduce occurrences of actual fraud involving the financial products, financial services, and access products provisioned to the customers of the financial institution.

Referring back to FIG. 2A, a queue management engine 218 executed by the one or more processors of FI computing system 130, may access each of the alerts maintained within alert queue 202, and may obtain a corresponding party identifier from each of the accessed alerts. For example, executed queue management engine 218 may access discrete alert 204A and obtain party identifier 206 associated with the first customer, and may access discrete alerts 204B and/or 206C and obtain party identifier 212 associated with the second customer. Executed queue management engine 218 may provision party identifiers 206 and 212 as an input to a process input engine 230 executed by the one or more processors of FI computing system 130 (e.g., based on programmatic comments generated by executed queue management engine 218, etc.).

In some instances, executed process input engine 230 may also access consolidated data store 144, and perform operations that identify, within consolidated data records 232, a subset 244 of consolidated data records that include party identifier 206 of the first customer involved in the potentially fraudulent transaction associated with discrete alert 204A, and a subset 244 of consolidated data records that include party identifier 212 of the second customer involved in the potentially fraudulent transaction associated with discrete alert 204B and the potentially fraudulent interaction associated with discrete alert 204B. As described herein, each of consolidated data records 232 may be associated with a customer of the financial institution, and may characterize, among other things, that customer and the transactional, spending, or non-financial interactions of that customer with the financial institution and with other financial institutions during a corresponding temporal interval. For example, and as described herein, each of consolidated data records 232 may include a corresponding customer identifier (e.g., an alphanumeric character string assigned to a corresponding customer), a corresponding temporal identifier (e.g., that identifies the corresponding temporal interval), and one or more consolidated data elements associated with the corresponding customer. Examples of these consolidated data elements may include, but are not limited to, elements customer data, account data, transaction data, activity data, and/or existing behavioral profile data, which may be ingested, processed, aggregated, or filtered by FI computing system 130 using any of the exemplary processes described herein.

In some instances, and as illustrated in FIG. 2A, each data record within subset 234 may include party identifier 206, a temporal identifier of a corresponding temporal interval, one or more consolidated elements of the customer, account, transaction, activity, and/or existing behavioral profile data that characterize the first customer during the corresponding temporal interval, and additionally, or alternatively, one or more elements of aggregated data that include aggregated values of account, transaction, or interaction parameters that characterize a behavior of the first customer during the corresponding temporal interval. By way of example, data record 236 of subset 234 may include party identifier 206, a corresponding temporal identifier 238 (e.g., "2022-03-31," indicating a temporal interval spanning Mar. 1, 2022, through Mar. 31, 2022), consolidated data elements 240 that identify and characterize the first customer during the temporal interval spanning Mar. 1, 2022, through Mar. 31, 2022, and aggregated data elements 252 that include aggregated values of account, transaction, or interaction parameters that characterize a behavior of the first customer during the temporal interval extending from Mar. 1, 2022, to Mar. 31, 2022.

Further, each data record within subset 244 may include party identifier 212, a temporal identifier of a corresponding temporal interval, one or more consolidated elements of the customer, account, transaction, activity, and/or existing behavioral profile data that characterize the second customer during the corresponding temporal interval, and additionally, or alternatively, one or more elements of aggregated data that include aggregated values of account, transaction, or interaction parameters that characterize a behavior of the second customer during the corresponding temporal interval. By way of example, data record 246 of subset 244 may include party identifier 212, a corresponding temporal identifier 248 (e.g., "2022-03-31," indicating a temporal interval spanning Mar. 1, 2022, through Mar. 31, 2022), consolidated data elements 250 that identify and characterize the second customer during the temporal interval spanning Mar. 1, 2022, through Mar. 31, 2022, and aggregated data 252 that include aggregated values of account, transaction, or interaction parameters that characterize a behavior of the particular customer during the temporal interval extending from Mar. 1, 2022, to Mar. 31, 2002.

Executed process input engine 230 may also perform operations that obtain, from consolidated data store 144, elements of process input data 196 characterizing a composition of an input dataset for the adaptively trained machine-learning or artificial-intelligence process (e.g., adaptively trained, gradient-boosted, decision-tree process described herein). In some instances, executed process input engine 230 may parse process input data 196 to obtain the composition of the input dataset, which not only identifies the elements of customer-specific data included within each input data set dataset (e.g., input feature values, as described herein), but also a specified sequence or position of these input feature values within the input dataset. Examples of these input feature values include, but are not limited to, one or more of the candidate feature values extracted, obtained, computed, determined, or derived by executed training input module 180 and packaged into corresponding portions of training datasets 184 using any of the exemplary processes described herein.

In some instances, and based on the parsed portions of process input data 196, executed process input engine 230 may that identify, and obtain or extract, one or more of the input feature values from one or more of data records maintained within subset 234 of consolidated data records 232. Executed process input engine 230 may perform operations that package the obtained, or extracted, input feature values within an input dataset 254 associated with the first customer and the potentially fraudulent transaction associated with discrete alert 204A, in accordance with their respective, specified sequences or positions. Further, in some examples, and based on the parsed portions of process input data 196, executed process input engine 230 may perform operations that compute, determine, or derive one or more of the input features values based on elements of data extracted or obtained from the additional ones of the consolidated data records. Executed process input engine 230 may perform operations that package each of the computed, determined, or derived input feature values into portions of input dataset 254 in accordance with their respective, specified sequences or positions.

Further, based on the parsed portions of process input data 196, executed process input engine 230 may also identify, and obtain or extract, one or more of the input feature values from one or more of data records maintained within subset 244 of consolidated data records 232. Executed process input engine 230 may perform operations that package the obtained, or extracted, input feature values within an input dataset 256 associated with the second customer and with the potentially fraudulent transaction associated with discrete alert 204B and the potentially fraudulent interaction associated with discrete alert 204C, in accordance with their respective, specified sequences or positions. Further, in some examples, and based on the parsed portions of process input data 196, executed process input engine 230 may perform operations that compute, determine, or derive one or more of the input features values based on elements of data extracted or obtained from the additional ones of the consolidated data records, and that Executed process input engine 230 may perform operations that package each of the computed, determined, or derived input feature values into portions of input dataset 256 in accordance with their respective, specified sequences or positions.

Executed process input engine 230 may also provide input dataset 254 (associated with the first customer) and input dataset 256 (associated with the second customer) as an input to a predictive engine 258 executed by the one or more processors of FI computing system 130 (e.g., based on programmatic commands generated by executed process input engine 230, etc.). As illustrated in FIG. 2A, executed predictive engine 258 may obtain, from consolidated data store 144, process parameter data 194 that includes one or more process parameters of the adaptively trained, machine learning or artificial intelligence process, and executed predictive engine 258 may perform operations that apply the adaptively trained machine-learning or artificial-intelligence process to input dataset 254, and to input dataset 256, in accordance with the process parameters set forth in process input data 196.

Based on the application of the adaptively trained machine-learning or artificial-intelligence process to input datasets 254 and 256, executed predictive engine 258 may perform any of the exemplary processes described herein to generate elements of behavioral profile data 260 and 262 (e.g., elements of output data) that characterize, for respective ones of the first and second customers, expected values of a targeted set of transactional or interaction parameters, and ranges of expected deviations from the values of the transactional or interaction parameters, during a corresponding temporal interval. As described herein, the expected values of the targeted set of transactional or interaction parameters, and the expected deviations from these values, may establish collectively a behavioral profile that characterizes a "normal" or "baseline" behavior of corresponding ones of the first and second customers, and the expected, customer-specific values of the targeted set of transaction or interaction parameters, and the ranges of expected deviations from the values of the transactional or interaction parameters, may enable FI computing system 130 to classify transactions initiated by the corresponding ones of the first and second customers, or interactions requested by the corresponding ones of the first and second customers, as consistent with, or inconsistent with, the normal or baseline behavior of these customers during the corresponding temporal interval.

Executed predictive engine 258 may also perform operation that store the elements of behavioral profile data 260 and behavioral profile data 262 in conjunction, or in association, with respective ones of party identifier 206 and party identifier 212 within a portion of an accessible data repository, such as profile data store 226 maintained within the one or more tangible, non-transitory memories of FI computing system 130. Further, although not illustrated in FIG. 2A, FI computing system 130 may perform any of the exemplary processes described herein to generate, and store within profile data store 226, elements of behavioral profile data associated with any additional, or alternate, one of the customers involved in the potentially fraudulent transactions or potentially fraudulent interactions characterized by the discrete alerts within alert queue 202, e.g., additional, or alternate, ones of alerts 204.

Figure 2B:
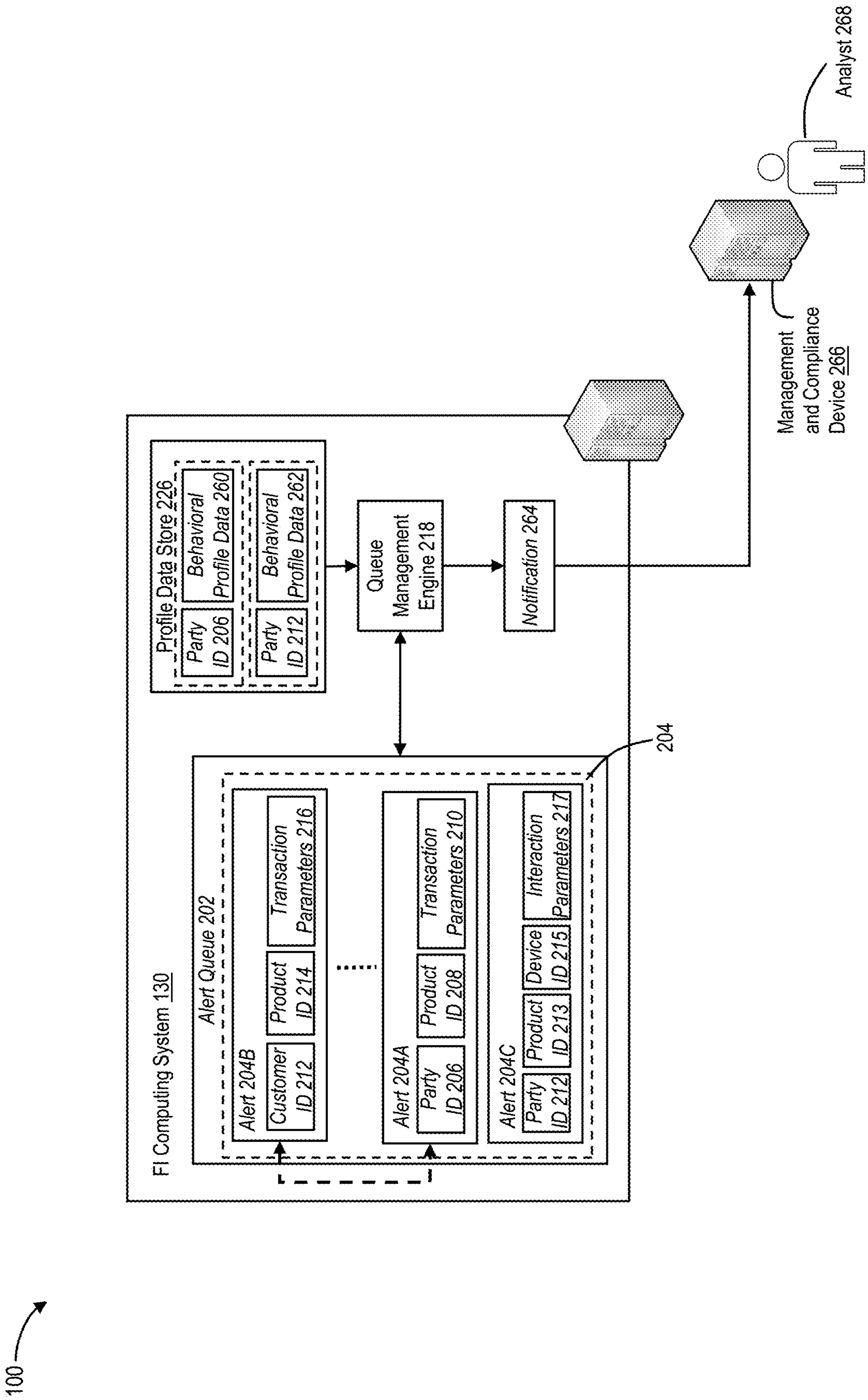

Referring to FIG. 2B, executed queue management engine 218 may perform operation that access profile data store 226 and obtain elements of behavioral profile data characterizing each of the customers involved in the potentially fraudulent transactions associated with queued alerts 204, include the elements of behavioral profile data 260 (e.g., associated with party identifier 206 and the first customer) and behavioral profile data 262 (e.g., associated with party identifier 212 and the second customer). Executed queue management engine 218 may perform any of the exemplary processes described herein to re-order, and re-prioritize, one or more of alerts 204 (including discrete alerts 204A, 204B, and 204C) within alert queue 202 based on the obtained, customer-specific elements of behavioral profile data, including the elements of behavioral profile data 260 and 262 that characterizes not only the "normal" or "baseline" behavior of the first and second customers, respectively, but also the expected deviations from the normal or baseline behavior.

As described herein, the discrete alerts maintained within alert queue 202, including discrete alerts 204A, 204B, and 204C, may be prioritized initially based on an application of one or more of the predetermined, prioritization rules described herein to values of the transaction or interaction parameters maintained within each of the discrete alerts, and position of corresponding ones of the discrete alerts within alert queue 202 may be indicative of a likelihood that a corresponding one of the initiated transaction or requested interactions represent an instance of actual fraud, e.g., as determined based on the application of the predetermined, prioritization rules. For example, discrete alert 204A may be disposed at an initial position within alert queue 202, which may indicate a substantial likelihood that the initiated transaction involving the first customer represents an instance of actual fraud, while discrete alerts 204B and 204C may disposed at positions subsequent to discrete alert 204A within alert queue 202, which may indicate successively reduced likelihoods that the initiated transaction and requested interaction involving the second customer represent instances of actual fraud. In some instances, described herein, executed queue management engine 218 may perform operations that re-prioritize, and re-order, discrete alert 204A, discrete alert 204B, and/or discrete alert 204C based on, among other things, the elements of behavioral profile data 260 and 262 that characterize the expected deviations from the normal or baseline behavior of respective ones of the first and second customers.

By way of example, based on product identifier 208 and values 210 of the transaction parameters maintained within discrete alert 204A, executed queue management engine 218 may establish that the first customer associated with party identifier 206 initiated the potentially fraudulent transaction associated with discrete alert 204A at a corresponding merchant at 3:00 p.m. on Thursday, Mar. 31, 2022, and that the customer elected to fund the $675.00 transaction amount with a credit-card account issued by the financial institution. Further, executed queue management engine 218 may parse the elements of behavioral profile data 260 and obtain, for purchase transactions involving the corresponding merchant and initiated during a temporal interval that includes the transaction time (e.g., between 12:00 p.m. and 4:00 p.m. on weekdays), information that include, among other things, an expected transaction amount of $650.00 and a range of expected deviations from the expected transaction amount of between $600.00 and $700.00. In some instances, although the application of the predetermined priority rules to discrete alert 204A may indicate a substantial likelihood that the initiated purchase transaction involving the first customer represents an instance of actual fraudulent activity, executed queue management engine 218 may determine that the $675.00 transaction amount of the initiated purchase transaction falls within the range of expected deviations from the expected transaction amount of $650.00, which indicates that the initiated, and potentially fraudulent, purchase transaction may not represent a likely instance of actual fraudulent activity.

Further, and based on product identifier 214 and values 216 of the transaction parameters maintained within discrete alert 204B, executed queue management engine 218 may establish that the second customer associated with party identifier 212 initiated the potentially fraudulent transaction associated with discrete alert 204B at an additional merchant at 3:00 a.m. on Thursday, Mar. 31, 2022, and that the customer elected to fund the $100.00 transaction amount with a debit-card account issued by the financial institution. Further, executed queue management engine 218 may parse the elements of behavioral profile data 262 and obtain, for purchase transactions involving the additional merchant, funded using the debit-card account, and initiated during a temporal interval that includes the transaction time (e.g., between 12:00 a.m. and 4:00 p.m. on weekdays), information that include, among other things, an expected transaction amount of $25.00 and a range of expected deviations from the expected transaction amount of between $15.00 and $35.00. In some instances, although the application of the predetermined priority rules to discrete alert 204B may indicate a reduced likelihood that the initiated purchase transaction involving second first customer represents an instance of actual fraudulent activity, executed queue management engine 218 may determine that the $100.00 transaction amount of the potentially fraudulent transaction falls outside the range of expected deviations from the expected transaction amount for transactions initiated by the second customer at the corresponding merchant, and involving the debit-card account, during the temporal interval that includes the transaction time, which indicates that the initiated, and potentially fraudulent, purchase transaction may represent a likely instance of actual fraudulent activity.

In some examples, based on product identifier 213, device identifier 215, and values 217 of the interaction parameters, executed queue management engine 218 may establish that the second customer associated with party identifier 212 requested a modification to an authentication credential (e.g., the corresponding "interaction type") at 9:45 a.m. on Thursday, Mar. 31, 2022, using a mobile banking application (e.g., the corresponding access product) disposed within postal code 20037 of Washington, D.C. Executed queue management engine 218 may further parse the elements of behavioral profile data 262 and obtain, for modifications to the authentication credential requested by the second customer using the mobile banking application, information that includes, among other things: (i) an expected transaction time of 8:30 a.m. on weekdays, with a range of deviations from the expected, 8:30 a.m. transaction time of between 7:00 a.m. and 10:30 a.m.; and (ii) an expected geographic location for the call disposed within postal code 20001 of Washington, D.C., and a range of deviations from the expected geographic location that establish a geographic region including postal codes 20001, 20005, 20007, 20036, 20037, and 20057 in Washington, D.C.

In some instances, executed queue management engine 218 may determine that the 9:45 a.m. interaction time associated with the requested modification to authentication credential falls within the range of expected deviations from the extracted interaction time for modifications to the authentication credential requested by the second customer using the mobile banking application, and that the disposition of the mobile phone within the 20037 postal code fails within the geographic region established by the range of deviations from the expected geographic location for modifications to the authentication credential requested by the second customer using the mobile banking application. Based on these determinations, executed queue management engine 218 may establish that the requested modification to the authentication credential is associated with a minimal likelihood of actual fraud, which is consistent with the outcome of the application of the one or more predetermined, prioritization rules to discrete alert 204C and consistent with the existing position of discrete alert 204C within alert queue 202.

Executed queue management engine 218 may also perform operations that re-prioritize, and re-order, discrete alert 204A within alert queue 202 based on the determination that the $675.00 transaction amount of the potentially fraudulent transaction involving the first customer falls within the range of expected deviations from the expected transaction amount of $650.00, and that re-prioritize, and re-order, discrete alert 204B within alert queue 202 based on the determination that the $100.00 transaction amount of the potentially fraudulent transaction falls outside the range of expected deviations from the expected transaction amount of $25.00. For example, as illustrated in FIG. 2B, executed queue management engine 218 may perform operations that re-prioritize discrete alert 204B to an initial position within alert queue 202, which may reflect the determination that the initiated, and potentially fraudulent, purchase transaction involving the second customer represents a likely instance of actual fraudulent activity, and that re-prioritize discrete alert 204A to a subsequent position within alert queue 202, which may reflect the determination that the initiated, and potentially fraudulent, purchase transaction involving the first customer does not represent an likely instance of actual fraudulent activity. Further, executed queue management engine 218 may maintain the position of discrete alert 204C within alert queue 202 based on the determined consistency of the requested modification of the authentication with the normal or baseline behavior of the second customer, as specified within the elements of behavioral profile data 262.

Executed queue management engine 218 may also perform operations that generate a notification 264 that includes all, or a selected portion, of the re-prioritized alerts within alert queue 202, including discrete alerts 204A, 204B, and 204C and in some instances one or more elements of behavioral profile data 260 and 262 (e.g., output data) that characterize the normal or baseline behavior of corresponding ones of the first and second customers (or data pointing to re-prioritized alerts 204A, 204B, and 204C within alert queue 202 and/or to behavioral profile data 260 and 262 within profile data store 226, such as one or more hyperlinks, etc.). Executed queue management engine 218 may also perform operations that cause FI computing system 130 to transmit notification 264 across communications network 120 to a monitoring and compliance device 266 operable by a representative of the financial institution, such as analyst 268.

Monitoring and compliance device 266 may include a computing device having one or more tangible, non-transitory memories, store data and/or software instructions, and one or more processors, configured to execute the software instructions. The one or more tangible, non-transitory memories may, in some aspects, store application programs, application engines or modules, and other elements of code executable by the one or more processors, such as, but not limited to, an executable web browser (e.g., Google Chrome™, Apple Safari™, etc.). Monitoring and compliance device 266 may include a display unit configured to present interface elements to a corresponding user, such as analyst 268, and an input unit configured to receive input from analyst 268, e.g., in response to the interface elements presented through display unit 109A. Monitoring and compliance device 266 may also include a communications interface 109C, such as a wireless transceiver device, coupled to the one or more processors and configured by the one or more processors to establish and maintain communications with communications network 120 via one or more communication protocols, such as WiFi®, Bluetooth®, NFC, a cellular communications protocol (e.g., LTE®, CDMA®, GSM®, etc.), or any other suitable communications protocol.

In some examples, monitoring and compliance device 266 may execute one or more application programs, such as a web browser, that presents a graphical representation of portions of the re-prioritized alerts of alert queue 202, and/or the corresponding elements of behavioral profile data 260 and 262, within one or more display screens of a digital interface, such as a browser window (e.g., via the display unit). A representative of the financial institution, such as analyst 268, may review each of the presented alerts and confirm, based on one or more predetermined fraud detection rules, and in conjunction with the corresponding elements of behavioral profile data 260 and 262 (e.g., based on transaction amount, etc.), whether the potentially fraudulent transactions, or the potentially fraudulent interactions associated with the re-prioritized alerts represent an actual instances of fraudulent activity. Further, and based on input provided to monitoring and compliance device 266 by analyst 268 (e.g., via the input unit), the executed application program may perform operations that confirm a status of each of the re-prioritized alerts, e.g., as representing instances of actual fraud, or not representing instance of actual fraud.

Although not illustrated in FIG. 2B, notification 264 may include data characterizing one or more patterns that, if observed within the presented representations of the re-prioritized alerts or the corresponding elements of behavioral profile data 260 and 262, would indicate that a potentially fraudulent transaction associated with one or more of the re-prioritized alerts represents a likely instance of actual fraudulent activity. For example, FI computing system 130 may perform operation that obtain additional elements of data characterizing initiated transactions and requested interactions deemed fraudulent by the financial institution (e.g., based on portions of transaction data 104C and portions of activity data 106, respectively, using any of the exemplary processes described herein). In some instances, FI computing system 130 may apply an additional, adaptively trained machine-learning or artificial-intelligence process, such an adaptively trained clustering process, an adaptively trained probabilistic graphical process, or a structured probabilistic process (or any of the additional, or alternate, machine learning or artificial intelligence processes described herein) to the additional data elements.

Based on the application of the additional, adaptively trained machine-learning or artificial-intelligence process additional data elements, FI computing system 130 may perform operations that generate elements of probabilistic data characteristic patterns in customer transactional or spending behavior (e.g., transaction amounts, transaction velocities, etc.) or in interaction-specific behavior (e.g., velocities in changes in authentication credentials, etc.) that are characteristic of actual instances of fraudulent activity involving customers of the financial institution. In some instances, FI computing system 130 may package portions of the probabilistic data into notification 264, which may be transmitted to monitoring and compliance device 266, and analyst 268 may confirm, based on one or more predetermined fraud detection rules, and in conjunction with the portions of the probabilistic data and the corresponding elements of behavioral profile data 260 and 262, whether the potentially fraudulent transactions, or the potentially fraudulent interactions associated with the re-prioritized alerts represent an actual instances of fraudulent activity.

Figure 3:
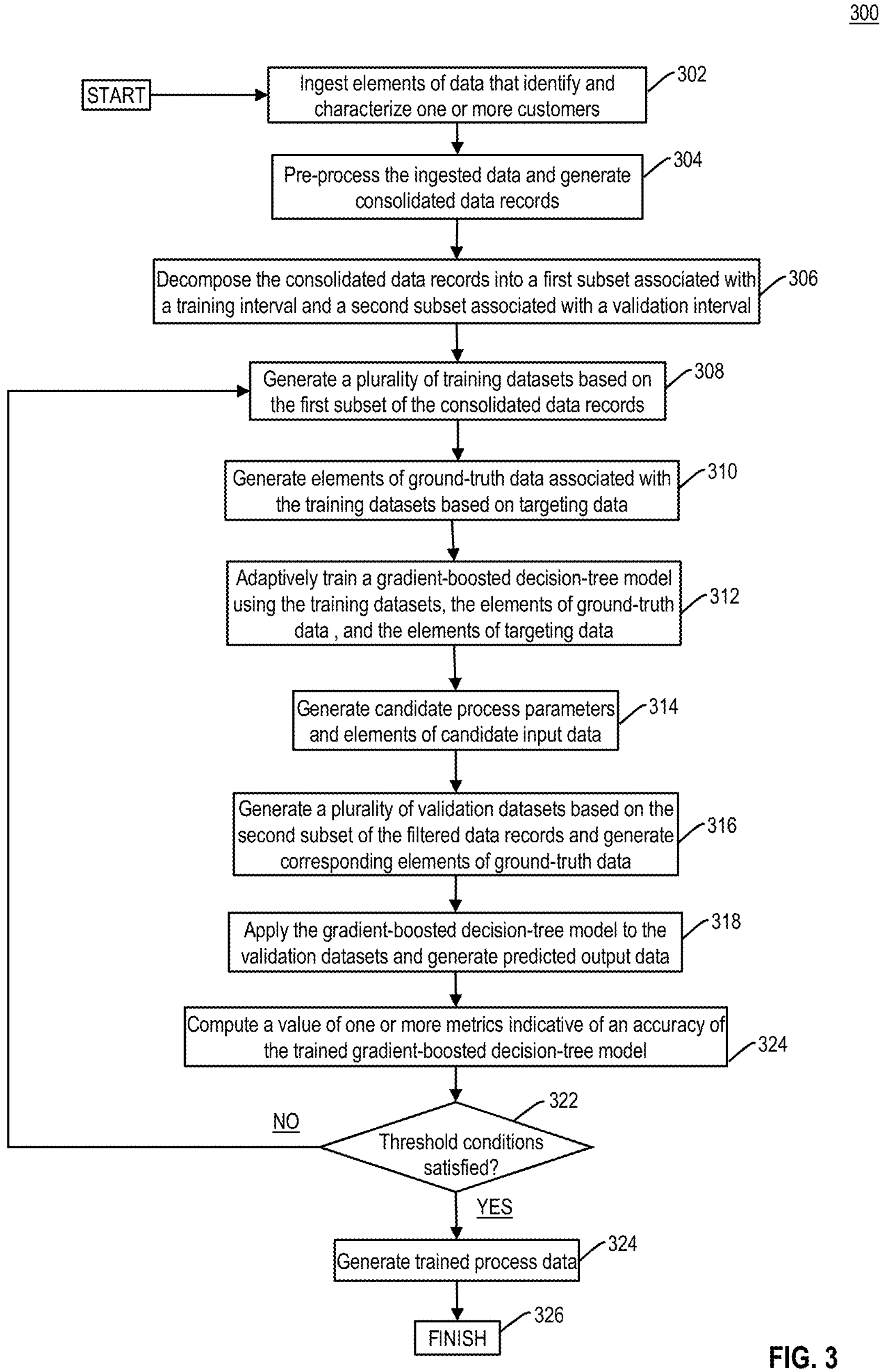
FIG. 3 is a flowchart of an exemplary process for adaptively training a machine learning or artificial intelligence process, in accordance with some exemplary embodiments.

FIG. 3 is a flow chart of an exemplary process 300 for adaptively training a machine-learning or artificial-intelligence process to predict an expected, customer-specific value of one or more targeted transaction or interaction parameters that characterize a behavior of a customer of the financial institution during a future temporal interval, and a range of expected deviations from each of these customer-specific values of the targeted transaction or interaction parameters during the future temporal interval, using training data associated with a first prior temporal interval, and using validation data associated with a second, and distinct, prior temporal interval, in accordance with the disclosed exemplary embodiments. As described herein, the expected values of the targeted transactional or interaction parameters, and additionally, or alternatively, the ranges of expected deviations from these values, may establish collectively a behavioral profile that characterizes an expected behavior of the customer during the future temporal interval and establishes a "normal" or "baseline" behavior of that customer during the future temporal interval.

As described herein, the machine-learning or artificial-intelligence process may, for example, include an ensemble or decision-tree process, such as a gradient-boosted decision-tree process (e.g., an XGBoost process). Further, in some examples, the machine-learning or artificial-intelligence process may include, but are not limited to, a clustering process, an unsupervised learning process (e.g., a k-means algorithm, a mixture model, a hierarchical clustering algorithm, etc.), a semi-supervised learning process, a supervised learning process, or a statistical process (e.g., a multinomial logistic regression model, etc.). The trained machine-learning or artificial-intelligence process may also include, among other things, a random decision forest, an artificial neural network, a deep neural network, or an association-rule process (e.g., an Apriori algorithm, an Eclat algorithm, or an FP-growth algorithm). In some instances, one or more computing systems, such as, but not limited to, one or more of the distributed components of FI computing system 130, may perform one or of the steps of exemplary process 300, as described herein.

Referring to FIG. 3, FI computing system 130 may perform operations that obtain, from one or more source computing systems, elements of data that identify and characterize one or more customers of the financial institution (e.g., in step 302 of FIG. 3). In some instances, FI computing system 130 may perform any of the exemplary programmatic or RPA-based processes described herein to obtain and ingest the elements of customer data 104A, account data 104B, transaction data 104C, activity data 106 and/or existing behavioral profile data 108, in accordance with a predetermined temporal schedule (e.g., on a monthly basis at a predetermined date or time, etc.), or a continuous streaming basis. FI computing system 130 may also perform operations, described herein, that store (or ingest) the obtained data elements within one or more accessible data repositories, such as aggregated data store 132 (e.g., also in step 302 of FIG. 3).

In some instances, the obtained elements of data may include, among other things, one or more elements of customer profile, account, and transaction data associated with corresponding ones of the customers, and FI computing system 130 may perform any of the exemplary programmatic or RPA-based processes described herein to obtain the one or more elements of customer profile, account, and transaction data from a corresponding one of the source systems, such as source system 102A of FIG. 1A. The obtained elements of data may include, among other things, one or more elements of activity data that characterize interactions between the financial institution and corresponding ones of the customers, and each of the interactions may be associated with an engagement between a corresponding one of the customers of the financial institution and an access product provisioned by the financial institution, e.g., via a corresponding digital channel. Further, the obtained elements of data may also include one or more elements of existing behavioral profile data that establish a behavioral profile associated with, and characterizing, corresponding ones of the customers during one, or more, prior temporal intervals. In some instances, FI computing system 130 may perform any of the exemplary programmatic or RPA-based processes described herein to obtain the one or more elements of interaction data and existing behavioral profile data from corresponding ones of the source systems, such as source systems 1026 and 102C of FIG. 1A, respectively.

Further, FI computing system 130 may perform any of the exemplary processes described herein to pre-process the ingested elements of customer data customer profile data, account, transaction, activity, and/or existing behavioral profile data and generate one or more consolidated data records (e.g., in step 304 of FIG. 3). For example, and as described herein, each of the consolidated data records may be associated with a particular one of the customers, and may include a corresponding pair of a customer identifier associated with the particular customer (e.g., an alphanumeric character string, etc.) and a temporal interval that identifies a corresponding temporal interval. Further, and in addition to the corresponding pair of customer and temporal identifiers, each of the consolidated data records may also include; (i) one or more consolidated elements of profile data, account, transaction, activity, and/or existing behavioral profile data that characterize the particular customer during the corresponding temporal interval associated with the temporal identifier; and (ii) one or more elements of aggregated data that include aggregated values of account, transaction, or interaction parameters characterizing a behavior of the particular customer during the corresponding temporal interval, and that augment each of the consolidated data records to include the corresponding elements of aggregated data. FI computing system 130 may store each of the consolidated data records within one or more accessible data repositories, such as consolidated data store 144 (e.g., also in step 304 of FIG. 3).

In some instances, FI computing system 130 may perform any of the exemplary processes described herein to decompose the filtered data records into (i) a first subset of the consolidated data records having temporal identifiers associated with a first prior temporal interval (e.g., the training interval $\Delta t_{training}$, as described herein) and (ii) a second subset of the filtered data records having temporal identifiers associated with a second prior temporal interval (e.g., the validation interval $\Delta t_{validation}$, as described herein), which may be separate, distinct, and disjoint from the first prior temporal interval (e.g., in step 306 of FIG. 3). By way of example, portions of the filtered data records within the first subset may be appropriate to train adaptively the machine-leaning or artificial process (e.g., the gradient-boosted decision model described herein) during the training interval $\Delta t_{training}$, and portions of the filtered records within the second subset may be appropriate to validate the adaptively trained gradient-boosted decision model during the validation interval $\Delta t_{validation}$.

FI computing system 130 may also perform any of the exemplary processes described herein to generate a plurality of training datasets based on elements of data obtained, extracted, or derived from all or a selected portion of the first subset of the consolidated data records (e.g., in step 308 of FIG. 3), and further, to generate an element of ground-truth data associated with each of the plurality of training datasets based on one or more elements of targeting data that identify and characterize each of the targeted transactional or interaction parameters (e.g., in step 310 of FIG. 3). By way of example, and as described herein, each of the plurality of training datasets may be associated with a corresponding one of the customers of the financial institution and a corresponding temporal interval, and may include, among other things a customer identifier associated with that corresponding customer, a temporal identifier representative of the corresponding temporal interval, and elements of data (e.g., feature values) that characterize the corresponding customer and financial and non-financial interactions of the corresponding customer and the financial institution, or with other financial institutions, during the corresponding temporal interval. Further, and as described herein, the one or more elements of ground-truth data associated each of the plurality of training datasets may include, among other things, at least a portion of the data characterizing the existing behavioral profile for the corresponding customer during the corresponding temporal interval (e.g., that portion consistent with the targeting data) and data characterizing initiated transactions or requested interactions involving the corresponding customer and deemed fraudulent during the corresponding temporal interval.

Based on the plurality of training datasets, and on corresponding elements of the ground-truth data, FI computing system 130 may also perform any of the exemplary processes described herein to train adaptively the machine-learning or artificial-intelligence to predict an expected, customer-specific value of one or more targeted transaction or interaction parameters that characterize a behavior of a customer of the financial institution during a future temporal interval, and a range of expected deviations from each of these customer-specific values of the targeted transaction or interaction parameters during the future temporal interval (e.g., in step 312 of FIG. 3). For example, FI computing system 130 may perform any of the exemplary processes described herein (e.g., in step 312 of FIG. 3) to train adaptively the machine-learning or artificial-intelligence process in accordance with elements of elements of targeting data that identify and characterize each of the targeted transactional or interaction parameters, and a maintenance of discrete features, or discrete groups of features, within training datasets generated through these exemplary adaptive training processes may be guided by corresponding values of Shapley feature values or by computed areas under curve for corresponding receiver operating characteristic (ROC) curves.

In some examples, the distributed components of FI computing system 130 may perform any of the exemplary processes described herein in parallel to adaptively train the machine-learning or artificial-intelligence process against the elements of training data included within each of the plurality of the training datasets. The parallel implementation of these exemplary adaptive training processes by the distributed components of FI computing system 130 may, in some instances, be based on an implementation, across the distributed components, of one or more of the parallelized, fault-tolerant distributed computing and analytical protocols described herein.

Through the performance of these adaptive training processes, FI computing system 130 may perform operations, described herein, that compute one or more candidate process parameters that characterize the adaptively trained machine-learning or artificial-intelligence process and that generate candidate input data for the adaptively trained machine-learning or artificial intelligence process, which specifies a candidate composition of an input dataset (e.g., in step 314 of FIG. 3). Further, FI computing system 130 may perform any of the exemplary processes described herein to access the second subset of the consolidated data records, and to generate a plurality of validation subsets having compositions consistent with the candidate input data, and to generate corresponding elements of ground-truth data (e.g., in step 316 of FIG. 3). As described herein, each of the plurality of the validation datasets may be associated with a corresponding one of the customers of the financial institution, and with a corresponding temporal interval within the validation interval $\Delta t_{validation}$, and may include a customer identifier associated with the corresponding one of the customers and a temporal identifier that identifies the corresponding temporal interval. Further, each of the plurality of the validation datasets may also include one or more feature values that are consistent with the candidate input data, associated with the corresponding one of the customers, and obtained, extracted, or derived from corresponding ones of the accessed second subset of the filtered data records.

In some instances, FI computing system 130 may perform any of the exemplary processes described herein to apply the adaptively trained machine-learning or artificial-intelligence process to respective ones of the validation datasets, and to generate corresponding elements of output data based on the application of the adaptively trained machine-learning or artificial intelligence process to the respective ones of the validation datasets (e.g., in step 318 of FIG. 3). As described herein, each of the generated elements of output data may be associated with a respective one of the validation datasets and as such, a corresponding one of the customers of the financial institution. Further, each of the generated elements of output data may also include an expected, customer-specific value of one or more transaction or interaction parameters that characterize a behavior of corresponding ones of the customers during the future temporal interval, and a range of expected deviations from each of these customer-specific values of the transaction or interaction parameters during the future temporal interval.

Further, and as described herein, the distributed components of FI computing system 130 may perform any of the exemplary processes described herein in parallel to validate the adaptively trained, machine-learning or artificial-intelligence process based on the application of the adaptively trained, machine-learning or artificial-intelligence process (e.g., configured in accordance with the candidate model parameters) to each of the validation datasets. The parallel implementation of these exemplary adaptive validation processes by the distributed components of FI computing system 130 may, in some instances, be based on an implementation, across the distributed components, of one or more of the parallelized, fault-tolerant distributed computing and analytical protocols described herein.

In some examples, FI computing system 130 may perform any of the exemplary processes described herein to compute a value of one or more metrics that characterize a predictive capability, and an accuracy, of the adaptively trained machine-learning or artificial intelligence process based on the generated elements of output data and corresponding ones of the validation datasets (e.g., in step 320 of FIG. 3), and to determine whether all, or a selected portion of, the computed metric values satisfy one or more threshold conditions for a deployment of the adaptively trained machine-learning or artificial intelligence process (e.g., in step 322 of FIG. 3). If, for example, FI computing system 130 were to establish that one, or more, of the computed metric values fail to satisfy at least one of the threshold requirements (e.g., step 322; NO), FI computing system 130 may establish that the adaptively trained machine-learning or artificial-intelligence process is insufficiently accurate for deployment and real-time application to the elements of customer profile, account, transaction, activity, and/or behavioral profile data described herein. Exemplary process 300 may, for example, pass back to step 308, and FI computing system 130 may perform any of the exemplary processes described herein to generate additional training datasets based on the elements of the consolidated data records maintained within the first subset.

Alternatively, if FI computing system 130 were to establish that each computed metric value satisfies threshold requirements (e.g., step 322; YES), FI computing system 130 may deem the machine-learning or artificial intelligence process adaptively trained and ready for deployment and real-time application to the elements of customer profile, account, transaction, activity, and/or behavioral profile data described herein, and may perform any of the exemplary processes described herein to generate trained process data that includes the candidate process parameters and candidate input data associated with the of the adaptively trained machine-learning or artificial intelligence process (e.g., in step 324 of FIG. 3). Exemplary process 300 is then complete in step 326.

Figure 4:
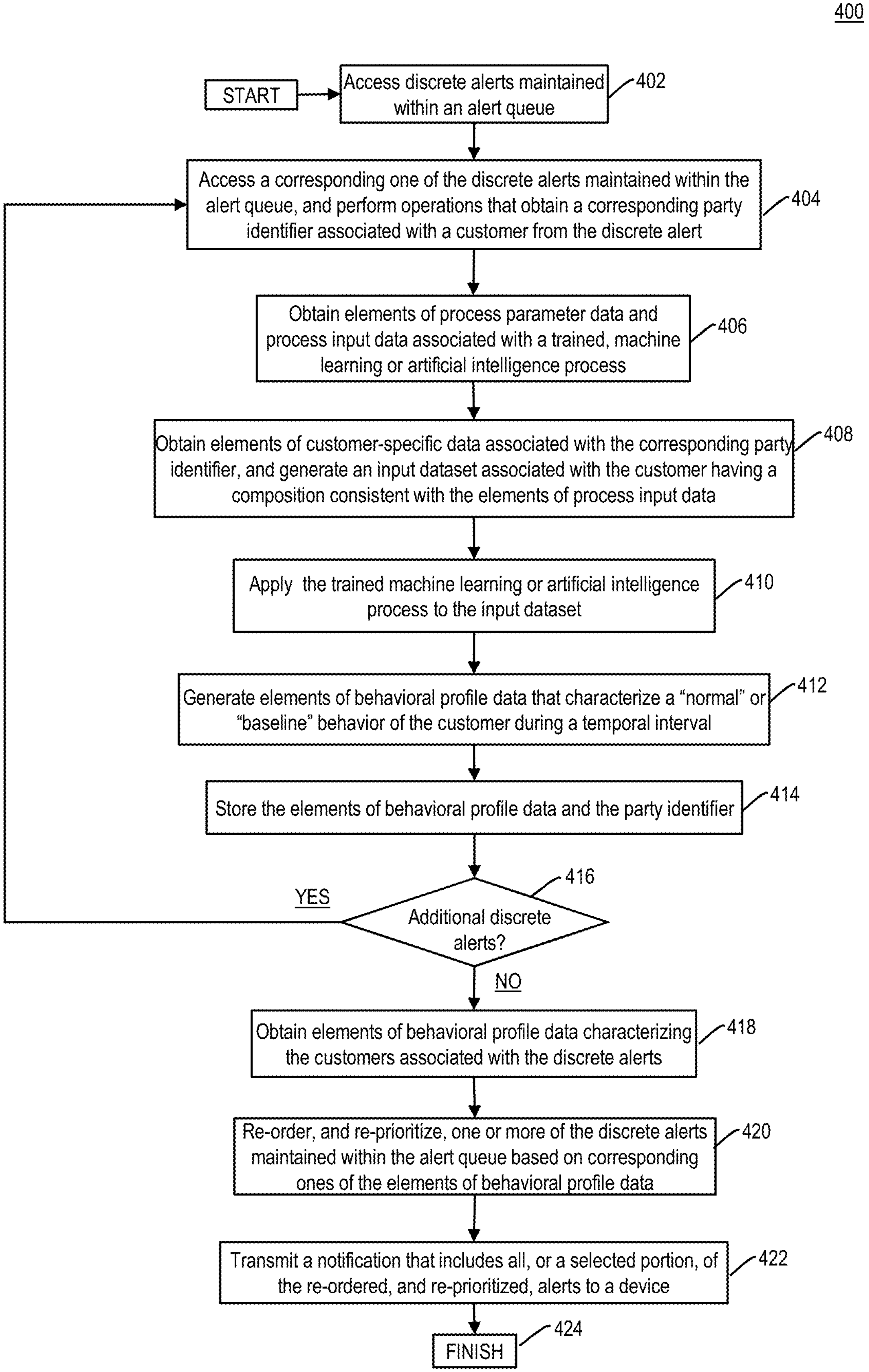
FIG. 4 is a flowchart of an exemplary process for dynamically prioritizing elements of queued data in accordance with adaptively predicted behavioral profiles, in accordance with some exemplary embodiments.

FIG. 4 is a flowchart of an exemplary process 400 for dynamically prioritizing elements of queued data in accordance with adaptively predicted behavioral profiles, in accordance some exemplary embodiments. As described herein, the behavioral profile for a corresponding customer of the financial institution may include an expected, customer-specific value of one or more targeted transaction or interaction parameters that characterize a behavior of the corresponding customer during a temporal interval, and additionally, or alternatively, a range of expected deviations from each of these customer-specific values of the transaction or interaction parameters during the future temporal interval. In some instances, the behavioral profile may characterize an expected transaction- or interaction-specific behavior of the corresponding customer during the temporal interval, which may establish a "normal" or "baseline" behavior of that customer during that temporal interval. As described herein, the behavior profile for the corresponding customer may be predicted adaptively based on an application of a trained, machine-learning or artificial-intelligence process to an input dataset having one or more of the feature values extracted, obtained, computed, determined, or derived from elements of customer, account, transaction, activity, and existing behavioral profile data that identify and characterize financial and non-financial interactions between the customer and the financial institution. In some instances, one or more computing systems, such as, but not limited to, one or more of the distributed components of FI computing system 130, may perform one or of the steps of exemplary process 400, as described herein.

Referring to FIG. 4, FI computing system 130 may perform operations that access one or more elements of queued data, such as, but not limited to, one or more discrete alerts maintained, and queued within, a corresponding alert queue (e.g., in step 402 of FIG. 4). In some instances, each of the discrete, queued alerts may identify and characterize a potentially fraudulent transaction involving a corresponding customer of the financial institution and financial products (e.g., payment instruments, deposit accounts, etc.) issued by the financial institution, and additionally or alternatively, a potentially fraudulent interaction requested by a corresponding customer of the financial institution and involving access products provisioned by the financial institution (e.g., mobile applications, web-based online banking platforms, or voice-based banking platforms, etc.). Further, and as described herein, the one or more discrete alerts may be prioritized, or ordered, initially within the alert queue based on an application of one or more predetermined prioritization rules to portions of the discrete alerts.

In some instances, FI computing system 130 may access a corresponding one of the discrete alerts maintained within the alert queue, and perform operations that obtain a corresponding party identifier from the discrete alert (e.g., in step 404 of FIG. 4). FI computing system 130 may also perform any of the exemplary processes described herein to obtain elements of process parameter data and process input data associated with a trained, machine-learning or artificial-intelligence process (e.g., in step 406 of FIG. 4). Further, the elements of process parameter data may specify corresponding values of one or more process parameters associated with the trained, machine learning or artificial intelligence process. Further, the elements of process input data specify a structure and composition of an input dataset associated with the trained, machine learning or artificial intelligence process.

Further, FI computing system 130 may also perform any of the exemplary processes described herein to access one or more elements of customer profile, account, transaction, activity, and/or existing behavioral profile data identifying and characterizing the customer associated with the corresponding party identifier, and to generate an input dataset associated with the customer having a composition consistent with the elements of process input data (e.g., in step 408 of FIG. 4). As described herein, FI computing system 130 may maintain the elements of customer profile, account, transaction, activity, and/or existing behavioral profile data in conjunction with the corresponding party identifier within one or more consolidated data records, such as, but not limited to, consolidated data records 232 of consolidated data store 144, and FI computing system 130 may perform any of the exemplary processes described herein to obtain, and ingest, an consolidate the elements of customer profile, account, transaction, activity, and/or existing behavioral profile data associated with the customer in accordance with a predetermined schedule (e.g., on a daily, weekly, or monthly basis) or based on a detected occurrence of a triggering event.

FI computing system 130 may perform any of the exemplary processes described herein to apply the trained machine-learning or artificial-intelligence process to the input dataset associated with the customer in accordance with the elements of process parameter data (e.g., in step 410 of FIG. 4). Further, and based on the application of the corresponding ones of the trained machine learning or artificial intelligence processes to the input dataset, FI computing system 130 may perform any of the exemplary processes described herein to generate elements of behavioral profile data that characterize, for the customer associated with the corresponding party identifier, expected values of a targeted set of transactional or interaction parameters during a temporal interval, and ranges of expected deviations from the values of the transactional or interaction parameter during the temporal interval (e.g., in step 412 of FIG. 4). As described herein, the expected values of the targeted set of transactional or interaction parameters, and the expected deviations from these values, may establish collectively a behavioral profile that characterizes a "normal" or "baseline" behavior of the customer associated with the corresponding party identifier during the temporal interval.

FI computing system 130 may also perform operation that store the elements of behavioral profile data in conjunction, or in association, with the corresponding party identifier of the customer, within a portion of an accessible data repository (e.g., in step 414 of FIG. 4). In some instances, FI computing system 130 may parse the discrete alerts maintained within the corresponding alert queue, and determine whether one or more of these discrete alerts are associated with an additional, or alternate, customer awaiting behavioral profiling through an implementation of any of the exemplary processes described herein (e.g., in step 416 of FIG. 4). If, for example, FI computing system 130 were to establish that at least one of the discrete alerts is associated with an additional, or alternate, customer awaiting behavioral profiling (e.g., step 416; YES), exemplary process 400 may pass back to step 404, and FI computing system 130 may perform operations that obtain a customer identifier of the additional, or alternate, customer from a corresponding one of the discrete alerts.

Alternatively, if FI computing system 130 were to establish that no additional, or alternate, customer awaiting behavioral profiling (e.g., step 416; NO), FI computing system 130 may obtain the elements of behavioral profile data characterizing each of the customers involved in the potentially fraudulent transactions, or the potentially fraudulent interactions, and associated with corresponding ones of the discrete alerts (e.g., in step 418 of FIG. 4). In some instances, FI computing system 130 may perform any of the exemplary processes described herein re-order, and re-prioritize, one or more of the discrete alerts maintained within the corresponding alert queue based on values of transaction or interaction parameters maintained within each of the one or more discrete alerts and on corresponding ones of the elements of behavioral profile data, which characterizes not only the "normal" or "baseline" behavior of the corresponding customers, respectively, but also the expected deviations from the normal or baseline behavior (e.g., in step 420 of FIG. 4).

FI computing system 130 may also perform any of the exemplary processes described herein to generate a notification that includes all, or a selected portion, of the reordered, and re-prioritized, discrete alerts within the corresponding alert queue, and that transmit the generated notification across communications network 120 to a computing system or device operable by a representative of the financial institution (e.g., in step 422 of FIG. 4). In some instances, the generated notification may also include one or more of the elements of behavioral profile data that characterize the normal or baseline behavior of corresponding ones of the first and second customers, or information pointing to a data repository that stores the re-prioritized discrete alerts within the corresponding alert queue and/or the elements of behavioral profile data, such as one or more hyperlinks to the stored discrete alerts or elements of behavioral profile data. Further, and some examples, the generated and transmitted notification may also include data characterizing one or more patterns in transaction or interaction parameters of the re-prioritized, discrete alerts that, if observed by the representative, would indicate that a potentially fraudulent transaction or interaction represents a likely instance of actual fraudulent activity. Exemplary process 400 is then complete in step 424.

Figure 5:
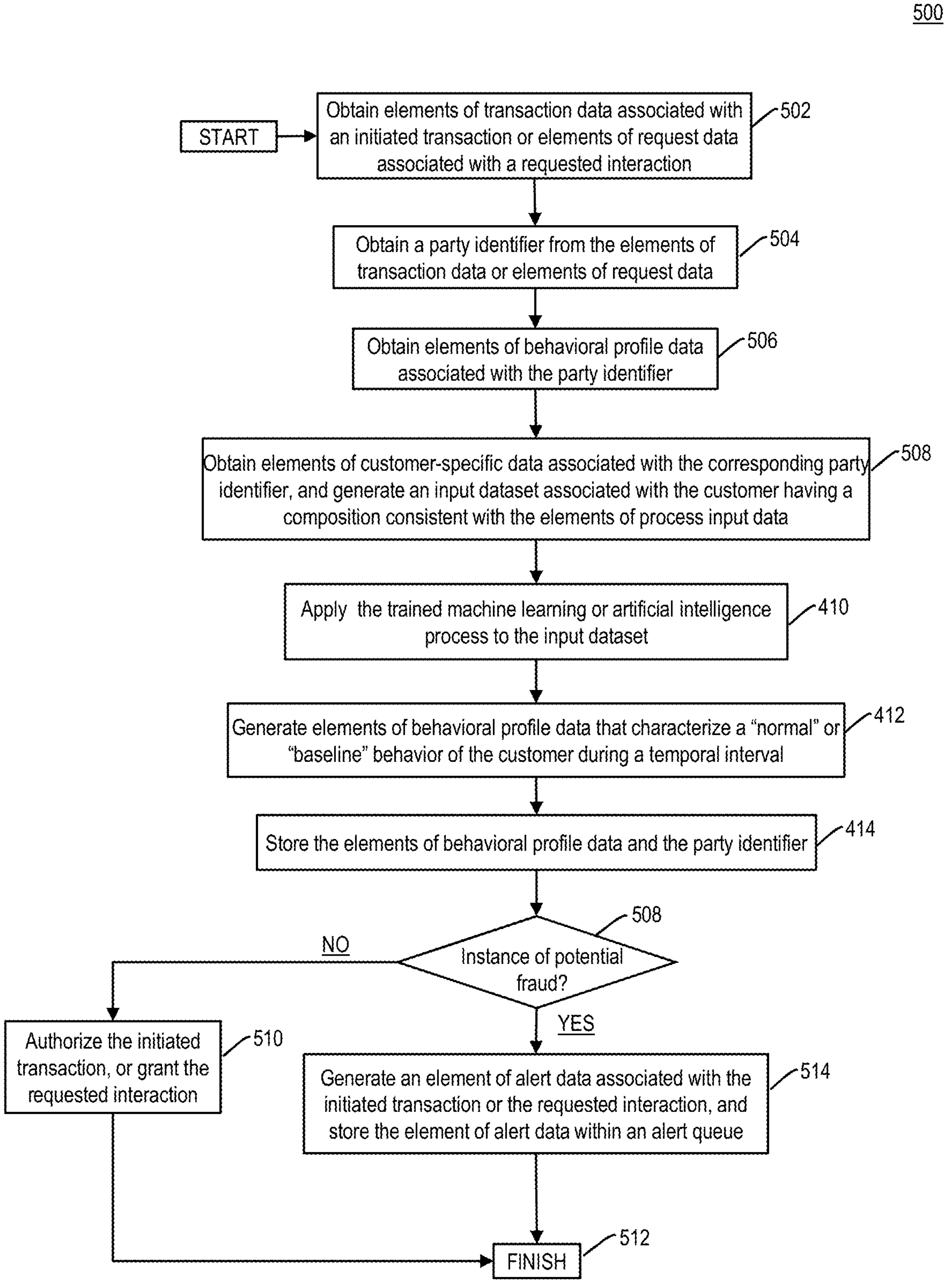
FIG. 5 is a flowchart of an exemplary process for detecting instances of potentially fraudulent activity based on adaptively predicted behavioral profiles, in accordance with some exemplary embodiments Like reference numbers and designations in the various drawings indicate like elements.

FIG. 5 is a flowchart of an exemplary process 500 for detecting instances of potentially fraudulent activity based on adaptively predicted behavioral profiles, in accordance some exemplary embodiments. As described herein, the behavioral profile for a customer of the financial institution may include an expected, customer-specific value of one or more targeted transaction or interaction parameters that characterize a behavior of the corresponding customer during a temporal interval, and additionally, or alternatively, a range of expected deviations from each of these customer-specific values of the transaction or interaction parameters during the temporal interval. In some instances, the behavioral profile may characterize an expected transaction- or interaction-specific behavior of the corresponding customer during the future temporal interval, which may establish a "normal" or "baseline" behavior of that customer during the future temporal interval. As described herein, the behavior profile for the corresponding customer may be predicted adaptively based on an application of a trained, machine-learning or artificial-intelligence process to an input dataset having feature values extracted, obtained, computed, determined, or derived from elements of customer, account, transaction, activity, and existing behavioral profile data described herein.

Referring to FIG. 5, FI computing system 130 may perform operations, described herein, that obtain elements of transaction data identifying and characterizing a transaction initiated by, or involving, the customer and a financial product issued by the financial institution and held by the customer, and additionally, or alternatively, elements of request data that identify and characterize a requested interaction between the particular customer and the financial institution (e.g., in step 502 of FIG. 5). As described herein, the elements of transaction data may include a customer identifier associated with the customer, temporal data characterizing a transaction date or time, an identifier of the financial product (e.g., a tokenized account number of a credit-card or deposit account held by the customer, etc.), and values of one or more transaction parameters that characterize the initiated transaction (e.g., a transaction amount, a counterparty identifier, etc.), and FI computing system 130 may receive the elements of transaction data from a computing system associated with or operated by a payment processing network or payment rail, e.g., as a portion of a request for authorization.

As described herein, the elements of interaction data may the customer identifier associated with the customer, a product identifier of the access product associated with the requested interaction, an identifier of the digital channel associated with the requested interaction, and one or more values of interaction parameters that characterize the potentially fraudulent interaction, such as, but not limited to, an interaction time, an interaction type associated with the requested interaction (e.g., the modification to the authentication credential), and geographic data characterizing the requested interaction (e.g., a geographic location of the computing device of the second customer, etc.). Further, and as described herein, the access products may include, but are not limited to mobile applications, web-based online banking platforms, or voice-based banking platforms accessible to the customers via corresponding computing devices or systems, and the requested interaction may include, among other things, a request to access elements of confidential data characterizing one or more financial products held by the particular customer via an executed mobile banking application (e.g. a balance or outstanding payment associated with a credit-card account, etc.), a request to modify one or more authentication credentials that identify the particular customer at the computing systems of the financial institution (e.g., a request to modify an alphanumeric password, etc.), or a request to modify an identifier of the customer device that participates in a two-factor authentication process (e.g., a request to update a telephone number of the customer device, etc.).

In some examples, FI computing system 130 may perform operations, described herein, to parse the received transaction data or the received request data to obtain a party identifier of the customer (e.g., in step 504 of FIG. 5), and to obtain elements of behavioral profile data that characterize, for the customer, expected values of a targeted set of transactional or interaction parameters, and ranges of expected deviations from the values of the transactional or interaction parameters (e.g., in step 506 of FIG. 5). As described herein, the expected values of the targeted set of transactional or interaction parameters, and the expected deviations from these values, may establish collectively a behavioral profile that characterizes a "normal" or "baseline" behavior of the customer during a temporal interval, and the expected, customer-specific values of the targeted set of transaction or interaction parameters, and the ranges of expected deviations from the values of the transactional or interaction parameters, may enable FI computing system 130 to classify transactions initiated by the customer, or interactions requested by the customer, as consistent with, or inconsistent with, the normal or baseline behavior of these customers.

For example, in step 506, FI computing system 130 may obtain the elements of behavioral profile data associated with the customer from a locally accessible data repository, such as profile data store 226, based on the customer identifier. In other examples, if the elements of behavioral profile data associated with the customer were unavailable within the data repository, or if the elements of behavioral profile data were associated with an invalid temporal interval (e.g., the elements of behavioral profile data characterize the customer's behavior during a prior temporal interval, etc.), FI computing system 130 may perform any of the exemplary processes described herein to obtain elements of process parameter data and process input data associated with a trained, machine learning or artificial intelligence process, and to generate an input dataset associated with the customer having a composition consistent with the elements of process input data (e.g., also in step 506 of FIG. 5). Further, FI computing system 130 may perform any of the exemplary processes described herein to apply the trained machine learning or artificial intelligence processes to the input dataset associated with the customer in accordance with the elements of process parameter data, and based on the application of the corresponding ones of the trained machine learning or artificial intelligence processes to the input dataset, FI computing system 130 may perform any of the exemplary processes described herein to generate the elements of behavioral profile data that characterize, for the customer, the expected values of a targeted set of transactional or interaction parameters, and the ranges of expected deviations from the values of the transactional or interaction parameter (e.g., also in step 506 of FIG. 5).

FI computing system 130 may also perform operations that access the values of the transaction or interaction parameters maintained within respective ones of the received transaction data or request data, and based on the elements of behavioral profile data and the values of the transaction or interaction parameters, determine whether the initiated transaction, or the requested interaction, are consistent with the baseline or normal behavior of the customer during the temporal interval, and as such, whether the initiated transaction, or the requested interaction, represent instances of potential fraudulent activity (e.g., in step 508 of FIG. 5). By way of example, if FI computing system 130 were to establish that the values of the transaction or interaction parameters are disposed within the ranges of expected deviations from the expected values of the targeted transaction of interaction parameters (e.g., as specified by the corresponding elements of behavioral profile data), FI computing system 130 may establish that the initiated transaction, or the requested interaction, fails to represent an instance of potentially fraudulent activity. Alternatively, in some examples, if FI computing system 130 were to establish that one or more of the values of the transaction or interaction parameters are disposed outside the ranges of expected deviations from the expected values of the targeted transaction of interaction parameters (e.g., as specified by the corresponding elements of behavioral profile data, FI computing system 130 may establish that the initiated transaction, or the requested interaction, represents an instance of potentially fraudulent activity.

Referring back to FIG. 5, if FI computing system 130 were to establish that the initiated transaction, or the requested interaction, fails to represent an instance of potentially fraudulent activity (e.g., step 508; NO), FI computing system 130 may perform operations that authorize the initiated transaction, or that grant the requested interaction (e.g., in step 510 of FIG. 5). Exemplary process 500 is then complete in step 512.

Alternatively, if FI computing system 130 were to establish that the initiated transaction, or the requested interaction, represent an instance of potentially fraudulent activity (e.g., step 508; NO), FI computing system 130 may perform any of the exemplary processes described herein to generate an element of alert data associated with the initiated transaction or the requested interaction that includes all, or a selected portion, of the received transaction data or the received request data, respectively, and to store the elements of alert data within a portion of a corresponding alert queue (e.g., in step 514 of FIG. 5). Exemplary process 500 is then complete in step 512.

C. Exemplary Hardware and Software Implementations

Exemplary embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, including, but not limited to, application programming interface (API) 134, ingestion engine 136, pre-processing engine 140, training engine 176, training input module 180, adaptive training and validation module 186, queue management engine 218, process input engine 230, and predictive engine 258, may be implemented as one or more computer programs, i.e., one or more modules of computer program instructions encoded on a tangible non transitory program carrier for execution by, or to control the operation of, a data processing apparatus (or a computer system). Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a web browser through which a user can interact with an implementation of the subject matter described in this specification, or any combination of one or more such back-end, middleware, or front-end components. The components of the system can be interconnected by any form or medium of digital data communication, such as a communication network.

Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the following listing of exemplary claims.

What is claimed is:

1. A computer server apparatus for re-ordering or re-prioritizing a position of a potentially fraudulent transaction or interaction within a fraud detection alert queue using a trained machine learning or artificial-intelligence process, comprising:

a memory storing instructions;

an electronic communications interface; and at least one processor coupled to the memory and the electronic communications interface, the at least one processor being configured to execute the instructions to:

obtain, from the alert queue, a data element associated with a requested digital interaction between the computer server apparatus and a computing device of a customer across a corresponding electronic communications network, the data element comprising a party identifier associated with the customer and a plurality of values of parameters associated with the requested digital interaction, the parameter values comprising a geographic location of the computing device and a temporal identifier associated with the interaction, the alert queue comprising data elements corresponding to potentially fraudulent transactions, and the data element being disposed within the alert queue at a position indicating a first likelihood that the requested digital interaction represents an instance of actual fraudulent activity;

obtain, from the memory, process input data that specifies a structure and composition of an input dataset associated with the trained machine-learning or artificial-intelligence process, the process input data identifying discrete input feature values and a specified sequence of the discrete input feature values within the input dataset;

obtain previous interaction data for the customer from the memory based on the party identifier, and generate the input dataset based on elements of the previous interaction data for the customer and in accordance with the process input data by (i) extracting a first feature value of the discrete input feature values from the previous interaction data or (ii) computing a second feature value of the discrete input feature values based on the first feature value, and by packaging the extracted or computed feature values at the specified sequence defined by the process input data, wherein the feature values comprise a targeted set of transaction or interaction parameters during a previous temporal interval, the targeted set including a temporal identifier corresponding to the previous temporal interval;

apply the trained machine-learning or artificial-intelligence process to the input dataset in accordance with one or more parameters that characterize the trained machine-learning or artificial-intelligence process, wherein the trained machine-learning or artificial-intelligence process is trained to predict, for the customer, customer-specific values of parameters that characterize a behavior of the customer during a future temporal interval and a range of expected deviations from each of these customer-specific values during the future temporal interval, and wherein the customer-specific values comprise at least time-averaged values associated with previous interactions of the customer;

based on the application of the trained machine-learning or artificial-intelligence process to the input dataset, generate behavioral profile data that includes an expected geographic location of the computing device during the future temporal interval and a range of expected deviations from the expected geographic location of the computing device during the future temporal interval;

based on a determination that the expected geographic location and the range of expected deviations fail to include the geographic location of the computing device at the time of the requested digital interaction, perform operations that modify the position of the data element within the alert queue, the modified position indicating a second likelihood that the requested digital interaction represents the instance of actual fraudulent activity, and the second likelihood exceeding the first likelihood; and transmit, in real-time, to an additional computing device via the communications interface, a notification that includes the data element and information characterizing the modified position of the data element within the alert queue, the additional computing device performing operations that confirm the requested digital interaction represents the instance of actual fraudulent activity based on the data element and the information.

2. The apparatus of claim 1, wherein the at least one processor is further configured to execute the instructions to:

store the behavioral profile data and the party identifier within a portion of the memory;

receive, via the electronic communications interface, information characterizing an additional exchange of data, the information comprising the party identifier and a second value of the parameter;

obtain the behavioral profile data from the memory based on the party identifier; and based on a determination that the range of expected deviations fails to include the second parameter value, determine that the additional data exchange represents an instance of potentially fraudulent activity, and generate an additional data element associated with the additional data exchange, the additional data element being maintained at a corresponding position within the alert queue.

3. The apparatus of claim 1, wherein the at least one processor is further configured to execute the instructions to:

obtain elements of second interaction data, each of the elements of the second interaction data comprising a temporal identifier associated with a temporal interval;

based on the temporal identifiers, determine that a first subset of the elements of the second interaction data are associated with a prior training interval, and that a second subset of the elements of the second interaction data are associated with a prior validation interval; and generate a plurality of training datasets based on corresponding portions of the first subset, and perform operations that train the trained machine-learning or artificial-intelligence process based on the training datasets.

4. The apparatus of claim 3, wherein the at least one processor is further configured to execute the instructions to:

generate a plurality of validation datasets based on corresponding portions of the second subset;

apply the trained machine-learning or artificial-intelligence process to the plurality of validation datasets, and generate additional elements of output data based on the application of the trained machine-learning or artificial-intelligence process to the plurality of validation datasets;

compute one or more validation metrics based on the additional elements of output data; and based on a determined consistency between the one or more validation metrics and a threshold condition, validate the trained machine learning or artificial intelligence process.

5. The apparatus of claim 1, wherein:

the requested digital interaction is associated with an access product, and at least one of the parameter values comprises a value of an interaction parameter associated with the requested digital interaction;

the behavioral profile data comprises an expected value of the interaction parameter during the temporal interval and ranges of expected deviations from the expected value during the temporal interval;

the at least one processor is further configured to execute the instructions to perform the operations that prioritize the position of the data element within the alert queue based on a determination that the range of expected deviations fails to include the interaction parameter value.

6. The apparatus of claim 1, wherein the additional computing device is configured to obtain at least the data element and the information characterizing the modified position of the data element within the alert queue, and present, within a digital interface, a graphical representation of the data element at the modified position within the alert queue.

7. The apparatus of claim 1, wherein:

the computing device is configured to execute an application program, the executed application program generating at least a portion of the data element; and the requested digital interaction comprises at least one of a request to obtain the application program associated with the computer server apparatus and executable by the computing device, a request to access a digital platform established by the at least one processor of the computer server apparatus, a request to access data across the electronic communications network via the application program, or a request to modify an authentication credential associated with the computing device.

8. The apparatus of claim 1, wherein:

the trained machine-learning or artificial-intelligence process comprises a trained gradient-boosted decision tree process; and the at least one processor is further configured to execute the instructions to:

establish a plurality of decision trees for the trained, gradient-boosted decision tree process based on one or more additional parameters that characterize the trained gradient-boosted decision tree process, and provision a corresponding element of the input dataset to an input node of each of the established decision trees; and based on the provisioning of the elements of the input dataset to the input nodes of the established decision trees, perform operations that apply the application of a trained gradient-boosted decision tree artificial intelligence process to the input dataset and generate the behavioral profile data.

9. A computer-implemented method for re-ordering or re-prioritizing a position of a potentially fraudulent transaction or interaction within a fraud detection alert queue using a trained machine learning or artificial-intelligence process, comprising:

obtaining, using at least one processor of a computer server, and from the alert queue, a data element associated with a requested digital interaction between the computer server and a computing device of a customer across a corresponding electronic communications network, the data element comprising party identifier associated with the customer and a plurality of values of parameters associated with the requested digital interaction, the first parameter values comprising a geographic location of the computing device and a temporal identifier associated with the interaction, the alert queue comprising data elements corresponding to potentially fraudulent transactions, and the data element being disposed within the alert queue at a position indicating a first likelihood that the requested digital interaction represents an instance of actual fraudulent activity;

using the at least one processor, obtaining process input data that specifies a structure and composition values of an input dataset associated with the trained machine-learning or artificial-intelligence process, the process input data identifying discrete input feature values and a specified sequence of the discrete input feature values within the input dataset;

using the at least one processor, obtaining previous interaction data for the customer from a data repository based on the party identifier, and generating the input dataset based on elements of the previous interaction data for the customer and in accordance with the process input data by (i) extracting a first feature value of the discrete input feature values from the previous interaction data or (ii) computing a second feature value of the discrete input feature values based on the first feature value, and by packaging the extracted or computed feature values at the specified sequence defined by the process input data, wherein the feature values comprise a targeted set of transaction or interaction parameters during a previous temporal interval, the targeted set including a temporal identifier corresponding to the previous temporal interval;

using the at least one processor, applying the trained machine-learning or artificial-intelligence to the input dataset in accordance with one or more parameters that characterize the trained machine-learning or artificial-intelligence process, wherein the trained machine-learning or artificial-intelligence process is trained to predict, for the customer, customer-specific values of parameters that characterize a behavior of the customer during a future temporal interval and a range of expected deviations from each of these customer-specific values during the future temporal interval, wherein the customer-specific values comprise at least time-averaged values associated with previous interactions of the customer;

based on an application of the trained machine-learning or artificial-intelligence process to the input dataset, generating behavioral profile data that includes an expected geographic location of the computing device during the future temporal interval and a range of expected deviations from the expected geographic location of the computing device during the future temporal interval;

based on a determination that the expected geographic location and the range of expected deviations fails to include the geographic location of the computing device at the time of the requested digital interaction, performing operations, using the at least one processor, that modify the position of the data element within the alert queue, the modified position indicating a second likelihood that the requested digital interaction represents the instance of actual fraudulent activity, and the second likelihood exceeding the first likelihood; and using the at least one processor, transmitting, in real-time, to an additional computing device, a notification that includes the data element and information characterizing the modified position of the data element within the alert queue, the additional computing device performing operations that confirm the requested digital interaction represents the instance of actual fraudulent activity based on the data element and the information.

10. The computer-implemented method of claim 9, further comprising:

using the at least one processor, store the behavioral profile data and the party identifier within a portion of a data repository;

receiving, using the at least one processor, information characterizing an additional exchange of data, the information comprising the party identifier and a second value of the parameter;

using the at least one processor, obtaining the behavioral profile data from the data repository based on the party identifier; and based on a determination that the range of expected deviations fails to include the second parameter value, determining, using the at least one processor, that the additional data exchange represents an instance of potentially fraudulent activity, and generate an additional data element associated with the additional data exchange using the at least one processor, the additional data element being maintained at a corresponding position within the alert queue.

11. The computer-implemented method of claim 9, further comprising:

obtain elements of second interaction data using the at least one processor, each of the elements of the second interaction data comprising a temporal identifier associated with a temporal interval;

based on the temporal identifiers, determining, using the at least one processor, that a first subset of the elements of the second interaction data are associated with a prior training interval, and that a second subset of the elements of the second interaction data are associated with a prior validation interval; and using the at least one processor, generating a plurality of training datasets based on corresponding portions of the first subset, and performing operations that train the trained machine-learning or artificial-intelligence process based on the training datasets.

12. The computer-implemented method of claim 11, further comprising:

generating, using the at least one processor, a plurality of validation datasets based on corresponding portions of the second subset;

using the at least one processor, applying the trained machine-learning or artificial-intelligence process to the plurality of validation datasets, and generating additional elements of output data based on the application of the trained machine-learning or artificial-intelligence process to the plurality of validation datasets;

computing, using the at least one processor, one or more validation metrics based on the additional elements of output data; and based on a determined consistency between the one or more validation metrics and a threshold condition, validating the trained machine-learning or artificial-intelligence process using the at least one processor,.

13. A tangible, non-transitory computer-readable medium storing instructions that, when executed by at least one processor of a computer server, cause the at least one processor to perform a method for re-ordering or re-prioritizing a position of a potentially fraudulent transaction or interaction within a fraud detection alert queue using a trained machine learning or artificial-intelligence process, comprising:

obtaining, from the alert queue, a data element associated with a requested digital interaction between the computer server and a computing device of a customer across a corresponding electronic communications network, the data element comprising party identifier associated with the customer and a plurality of values of parameters associated with the requested digital interaction, the first parameter values comprising a geographic location of the computing device and a temporal identifier associated with the interaction, the alert queue comprising data elements corresponding to potentially fraudulent transactions, and the data element being disposed within the alert queue at a position indicating a first likelihood that the requested digital interaction represents an instance of actual fraudulent activity;

obtaining process input data that specifies a structure and composition of an input dataset associated with the trained machine-learning or artificial-intelligence process, the process input data identifying discrete input feature values and a specified sequence of the discrete input feature values within the input dataset;

obtaining previous interaction data for the customer from a data repository based on the party identifier, and generating the input dataset based on elements of the previous interaction data for the customer and in accordance with the process input data by (i) extracting a first feature value of the discrete input feature values from the previous interaction data or (ii) computing a second feature value of the discrete input feature values based on the first feature value, and packaging the extracted or computed feature values at the specified sequence defined by the process input data, wherein the feature values comprise a targeted set of transaction or interaction parameters during a previous temporal interval, the targeted set including a temporal identifier corresponding to the previous temporal interval;

applying the trained machine-learning or artificial-intelligence process to the input dataset in accordance with one or more parameters that characterize the trained machine-learning or artificial-intelligence process, wherein the trained machine-learning or artificial-intelligence process is trained to predict, for the customer, customer-specific values of parameters that characterize a behavior of the customer during a future temporal interval and a range of expected deviations from each of these customer-specific values during the future temporal interval, wherein the customer-specific values comprise at least time-averaged values associated with previous interactions of the customer;

based on the application of the trained machine-learning or artificial-intelligence process to the input dataset, generating behavioral profile data that includes an expected geographic location of the computing device during the future temporal interval and a range of expected deviations from the expected geographic location of the computing device during the future temporal interval;

based on a determination that the expected geographic location and the range of expected deviations fail to include the geographic location of the computing device at the time of the requested digital interaction, perform operations that modify the position of the data element within the alert queue, the modified position indicating a second likelihood that the requested digital interaction represents the instance of actual fraudulent activity, and the second likelihood exceeding the first likelihood; and transmitting, in real-time, to an additional computing device, a notification that includes the data element and information characterizing the modified position of the data element within the alert queue, the additional computing device performing operations that confirm the requested digital interaction represents the instance of actual fraudulent activity based on the data element and the information.

* * * * *